(12) United States Patent
Bodas et al.

(10) Patent No.: US 7,093,099 B2
(45) Date of Patent: Aug. 15, 2006

(54) NATIVE LOOKUP INSTRUCTION FOR FILE-ACCESS PROCESSOR SEARCHING A THREE-LEVEL LOOKUP CACHE FOR VARIABLE-LENGTH KEYS

(75) Inventors: Amod Bodas, Cupertino, CA (US); Tarun Kumar Tripathy, Fremont, CA (US); Mehul Kharidia, Santa Clara, CA (US); Millind Mittal, Palo Alto, CA (US); J. Sukarno Mertoguno, San Jose, CA (US)

(73) Assignee: Alacritech, Inc., San Jose, CA (US)

( * ) Notice: Subject to any disclaimer, the term of this patent is extended or adjusted under 35 U.S.C. 154(b) by 583 days.

(21) Appl. No.: 10/249,359

(22) Filed: Apr. 2, 2003

(65) Prior Publication Data

US 2004/0117600 A1 Jun. 17, 2004

Related U.S. Application Data

(63) Continuation-in-part of application No. 10/248,029, filed on Dec. 12, 2002.

(51) Int. Cl.
G06F 12/06 (2006.01)

(52) U.S. Cl. ..................................................... 711/206

(58) Field of Classification Search ................ 711/154, 711/206; 712/23, 210, 242; 703/21; 709/234; 707/103; 370/392
See application file for complete search history.

(56) References Cited

U.S. PATENT DOCUMENTS

| | | | | |
|---|---|---|---|---|
| 3,717,851 A | | 2/1973 | Cocke ........................ 711/220 |
| 4,991,133 A | * | 2/1991 | Davis et al. ................ 709/234 |
| 5,133,077 A | * | 7/1992 | Karne et al. ................. 712/23 |
| 5,226,172 A | | 7/1993 | Seymour et al. ............ 709/222 |
| 5,231,599 A | | 7/1993 | Peters et al. ................ 708/146 |
| 5,341,483 A | | 8/1994 | Frank et al. ................ 711/226 |
| 5,550,542 A | | 8/1996 | Inoue ........................... 341/67 |
| 5,623,262 A | | 4/1997 | Normile et al. ............... 341/67 |
| 5,774,739 A | | 6/1998 | Angle et al. .................. 712/34 |
| 5,864,852 A | | 1/1999 | Luotonen .................... 713/201 |
| 5,896,521 A | * | 4/1999 | Shackleford et al. ......... 703/21 |
| 5,917,821 A | | 6/1999 | Gobuyan et al. ........... 370/392 |

(Continued)

OTHER PUBLICATIONS

Bernd Klauer, Andreas Bleck, Klause Waldschmidt, "The AM3 Associative Processor", 1995, IEEE Micro, pp. 70-78.*

(Continued)

*Primary Examiner*—Pierre Bataille
*Assistant Examiner*—Paul Schlie
(74) *Attorney, Agent, or Firm*—Stuart Auvinen; Mark Lauer

(57) ABSTRACT

A processor natively executes lookup instructions. The lookup instruction is decoded to determine which general-purpose register (GPR) contains a pointer to a lookup key in a buffer. A variable-length key is read from the buffer and hashed to generate an index into a first-level cache and a hashed tag. An address of a bucket of entries for the index is generated and tags from these entries are read and compared to the hashed tag. When an entry matches the hashed tag, a second-level entry is read. A stored key from the second-level entry is compared to the input key to determine a match. The addresses of the matching second-level and first-level entries are written to GPR's specified by operands decoded from the lookup instruction. When the key or entry data is long, the second-level entry also contains a pointer to a key extension or data extension in a third-level cache.

20 Claims, 16 Drawing Sheets

U.S. PATENT DOCUMENTS

| | | | | |
|---|---|---|---|---|
| 6,128,623 | A * | 10/2000 | Mattis et al. | 707/103 R |
| 6,230,231 | B1 | 5/2001 | DeLong et al. | 711/3 |
| 6,349,379 | B1 * | 2/2002 | Gibson et al. | 712/210 |
| 6,374,326 | B1 | 4/2002 | Kansal et al. | 711/108 |
| 6,393,544 | B1 | 5/2002 | Bryg et al. | 711/220 |
| 6,484,250 | B1 | 11/2002 | Mei et al. | 711/216 |
| 2002/0116587 | A1 * | 8/2002 | Mlodelski et al. | 711/154 |
| 2002/0116603 | A1 * | 8/2002 | Kissell | 712/242 |
| 2002/0172203 | A1 * | 11/2002 | Ji et al. | 370/392 |

OTHER PUBLICATIONS

Matthew McCormic, Jonathan Ledlie, "A fast File System for Cacheing Web Objects", 2001, University of Wisconsin, pp. 1-12.*

Michael Gschwind, "Instruction Set Selection for ASIP Design", 1999, CODES, pp. 7-11.*

IBM Technical Disclosure Bulletin NA84124001, "Move and Process (Map) Instruction", Dec. 1, 1984.*

* cited by examiner

LUP:

LUPu:

LUPinval:

LUPinc:

LUPdec:

NATIVE LOOKUP INSTRUCTION FOR FILE-ACCESS PROCESSOR SEARCHING A THREE-LEVEL LOOKUP CACHE FOR VARIABLE-LENGTH KEYS

CROSS REFERENCE TO RELATED APPLICATIONS

This application is a continuation-in-part of the co-pending application for "Functional-Level Instruction-Set Computer Architecture for Processing Application-Layer Content-Service Requests Such as File-Access Requests", U.S. Ser. No. 10/248,029, filed Dec. 12, 2002.

BACKGROUND OF INVENTION

This invention relates to microprocessors, and more particularly to table-lookup instruction execution.

Compared with reduced instruction set computer (RISC) microprocessors, complex instruction set computer (CISC) processors execute relatively complex instructions, such as multiplies, memory-indirect moves, and register exchanges. However, these CISC instructions are still much less complex that higher-level application program code.

For example, searching a table of file mappings or translations requires execution of many CISC instructions to construct addresses, read from the table, compare or the data read, and to copy results or addresses to registers. When the lookup term is a long string, more CISC instructions are needed to read the string from memory and move it into the microprocessor's general-purpose registers (GPR's) before the string can be compared to table entries. Long strings may require multiple cycles to move and compare fixed-size portions of data.

The parent application disclosed a functional-level instruction-set computing (FLIC) architecture that can execute function-level instructions that are more complex that CISC instructions. The FLIC architecture also could access variable-length operands using an execution buffer accessible from the processor's execution pipeline. Pointers in the fixed-width GPR's point to variable-length operands in the execution buffer. Execution resources in the processor's pipeline can directly access the variable-length operands in the execution buffer.

One of the FLIC instructions that can be natively executed on the FLIC architecture is a lookup instruction. The lookup instruction causes the processor pipeline to perform many sub-tasks, such as reading and processing a variable-length string to generate a lookup key, generating addresses to read the lookup table, comparing table entries to the key, and writing addresses for matching entries to the registers.

FIG. 1 shows a lookup instruction. Lookup instruction 10 has a width of 32 bits (four bytes) and can be decoded by an instruction decoder for a FLIC processor. Execution of lookup instruction 10 is native, since lookup instruction 10 is not recompiled or translated into many machine-level instructions; lookup instruction 10 is a machine-level instruction.

Lookup instruction 10 contains opcode 12, which is a multi-bit binary number that indicates the type of operation performed by instruction 10. Other native instructions have other binary numbers in the opcode field. Opcode 12 is decoded by the processor's instruction decoder to determine what operation to perform, and perhaps to select a micro-routine of micro code or a sequence of cycles and control signals in a hardware or firmware sequencer.

Opcode 12 is an 8-bit code in this example, allowing for as many as 256 different instruction types to be decoded, such as branches, compares, moves, read/write, input/output, adds, multiplies, divides, etc. Flavor 14 contains a 6-bit binary number that selects a variant or "flavor" of the lookup instruction. For example, one flavor returns the address of a match in the table, another flavor invalidates a matching entry, another allocates a new entry on a miss, other flavors copy data. Flavor 14 is decoded by the instruction decoder to determine the variation of the basic lookup operation to be performed.

The lookup table or cache can be sub-divided into several sub-caches called sections. Different kinds of translations can be stored in the different sections. Section field 16 contains a 3-bit section number that selects one of up to 8 sections in the lookup cache.

Operands are specified by operand fields 20, 22, 24. The input operands are specified by registers M and N while the output result is placed in register R. Operand fields 20, 22, 24 are each 5-bit fields, each selecting one register from among 32 registers in the processor's GPR's.

The user or programmer can perform a cache lookup by including a lookup instruction in the assembly or machine code. The programmer or the code complied by a compiler program specifies the lookup instruction's opcode and flavor code, and the section number of the cache to be searched. The register codes are appended to generate the 32-bit instruction. The FLIC processor decodes this 32-bit instruction and has the execution pipeline execute the lookup instruction routing data to and from the specified registers or locations specified by the registers.

SUMMARY

In one embodiment, a micro-processor is disclosed comprising: an instruction decoder for decoding instructions in a program being executed by the processor, the instructions including a lookup instruction; a register file containing registers that store operands operated upon by the instructions, the registers being identified by operand fields in the instructions decoded by the instruction decoder; a memory-access unit for accessing entries of a lookup cache; an address generator for generating an address to the memory-access unit; a comparator for comparing stored keys read from the entries to an input key; wherein the input key is a variable-length operand; a lookup unit, activated by the instruction decoder when the lookup instruction is decoded, for performing a lookup operation indicated by the lookup instruction, the lookup operation searching the lookup cache for a matching entry that has a stored key that matches the input key, whereby the lookup instruction is decoded and executed by the processor.

DETAILED DESCRIPTION

The present invention relates to an improvement in microprocessors. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
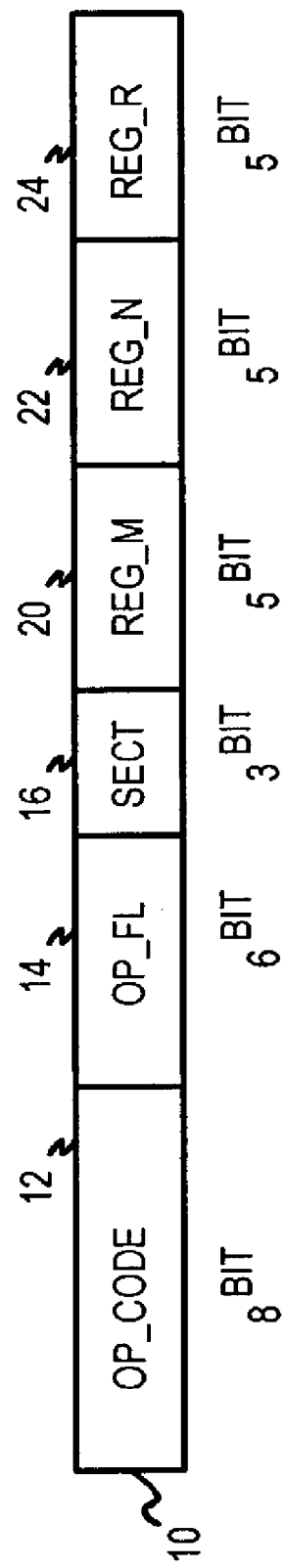
FIG. 1 shows a lookup instruction.
Figure 2:
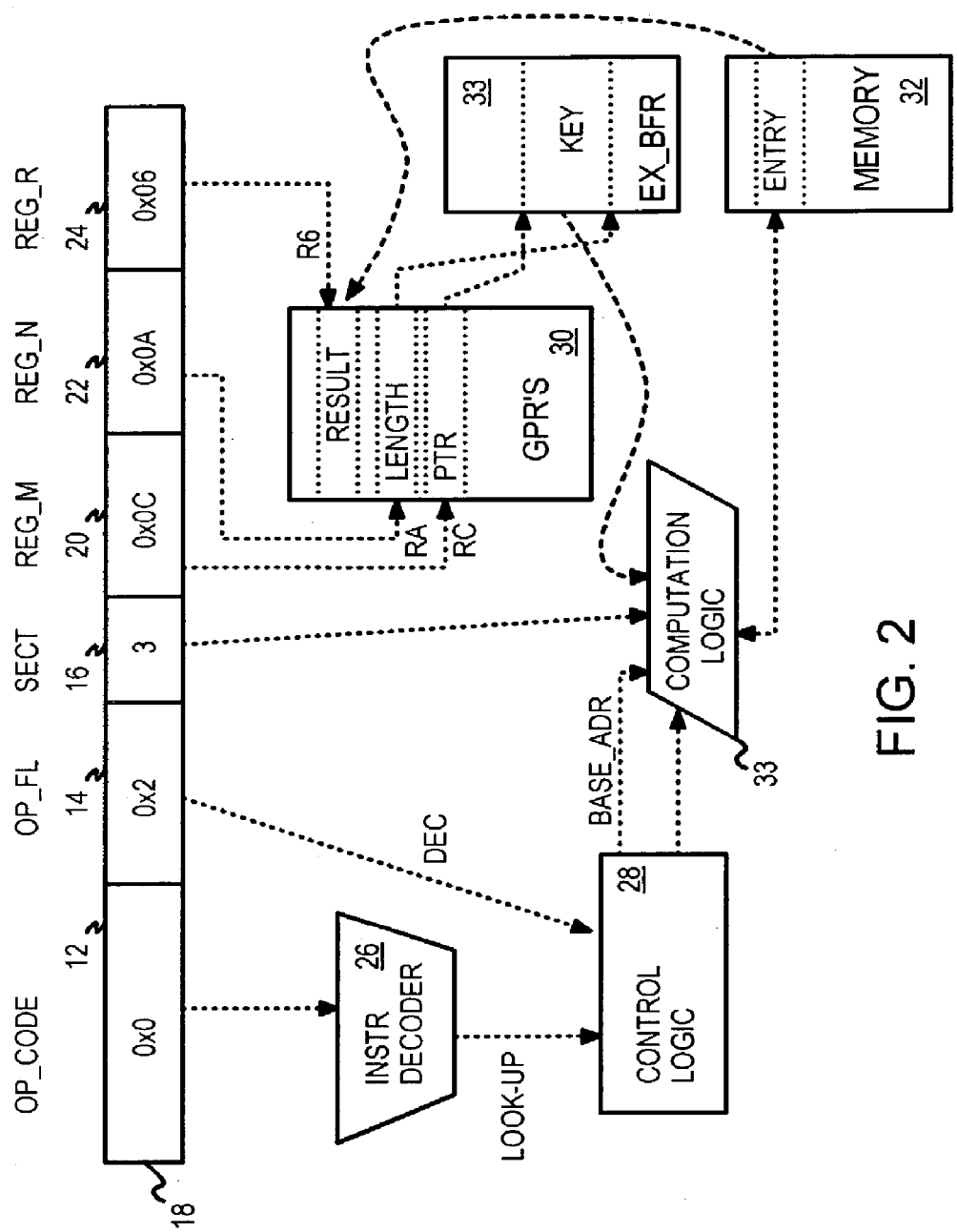
FIG. 2 is an overview of execution of a native lookup instruction.

FIG. 2 is an overview of execution of a native lookup instruction. Program code is complied into native instructions, which are loaded into memory and fetched into an instruction buffer. As instructions are executed and removed from the instruction buffer, eventually a lookup instruction is ready for execution and is available in instruction register 18 or otherwise in a next-instruction location in the instruction buffer.

Instruction decoder 26 reads opcode 12 from instruction register 18 and decodes the opcode to determine what operation is called for by the instruction in instruction register 18. In this example, opcode 12 is 0×00 (hex), which is the opcode for the lookup instruction. Instruction decoder 26 activates control logic 28 that causes the processor execution pipeline to perform the lookup operation.

Flavor 14 is also decoded, either by instruction decoder 26 or by selecting particular functions selected by decoder 26. Control logic 28 may activate sub-blocks of control logic to perform common sub-tasks such as address generation. In this example, flavor 14 is 0×2, or option 2, which is the decrement flavor. A reference count (C) is decremented in this flavor.

A lookup key is also generated using the input operands. Operand fields 20, 22 specify which registers in GPR's 30 are the M and N registers. In this example, register M is register C (RC) while register N is register A (RA). Register M contains a pointer to a location in execution buffer 33 where the input string or key is located. Register N contains the length of the key in bytes. For example, register RC contains pointer 1, which points to the start of the key in execution buffer 33, while register RA contains the key length, which specifies the end of the key. The lookup key can then be hashed to generate an index into the lookup cache.

The index is then scaled by the size of a set of entries (a bucket of entries) and added to the base address of the section of the lookup cache by computation logic 33. The section number from section field 16 selects the proper section base address. Computation logic 33 can be specialized execution logic, or part of a larger arithmetic-logic-unit (ALU) or an address-generation unit. The address generated by computation logic 33 is the address of a set (bucket) of entries in the lookup cache in memory 32 for the index generated from the key. Memory 32 is read for these entries.

The tag stored with each entry in the set is compared to the portion of the hashed key and/or the key itself to find a matching entry in the set of entries for the index. The address of this matching entry, or data from that entry is then written into the result register. The result register (RR) is indicated by operand field 24 of the instruction, which is 0×6 in this example, for register R6 in GPR's 30. The reference-count byte in the matching entry in memory 32 can also be decremented as required by flavor 14 (decrement).

Figure 3:
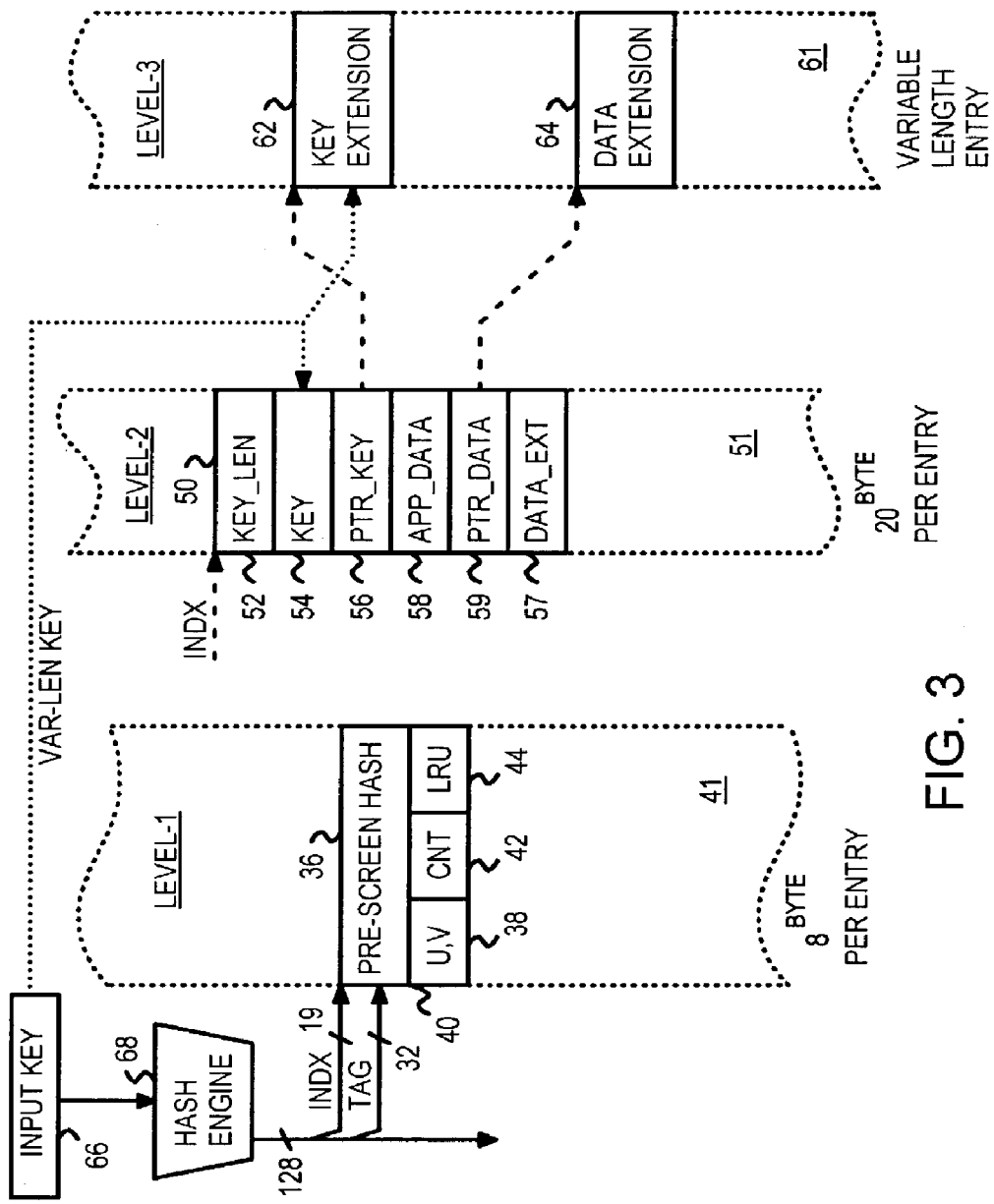
FIG. 3 shows a three-level lookup table and hashing of the input key.

FIG. 3 shows a three-level lookup cache and hashing of the input key. Input key 66 is a variable-length string in the execution buffer that is pointed to by a register specified in the instruction's operand fields. Hash engine 68 performs a hashing operation, such as the message-digest 5 (MD5) algorithm that produces a 128-bit hash output. The hash function can produce a fixed-width output from variable-width inputs since it performs functions that combine data from many bits. For example, the lowest 19 bits of the 128-bit hash from hash engine 68 can be extracted as the 19-bit index. This index selects one of $2^{19}$ (512K) sets or buckets of entries in the lookup cache.

Another 32 bits of the hash are extracted and compared to the tags from the entries in the selected bucket. The remaining 77 hash bits can be discarded. When an entry has a tag that mis-matches, the next entry in the bucket is examined. If no entries in the bucket have tags that match the hash bits, then a miss is signaled.

When one of the entries in the bucket selected by the index has a tag that matches the 32 hash bits from hash engine, a matching entry is found in level-1 cache 41. Entry 40 has tag field 36 with 32 bits that match the 32 has bits from hash engine 68. Entry 40 also contains a control word with update, valid bits 38, reference-count byte 42, least-recently-used (LRU) byte 44, and reserved bits.

Tag field 36 contains a part of the hash of input key 66, rather than the actual input key. Thus tag field 36 only allows for pre-screening entries. It is possible, although unlikely, that two different input keys have the same hashed tag. Thus further verification is required of the level-1 match.

The full key is stored in higher levels of the lookup cache. Each entry in level-1 cache 41 has a corresponding entry in level-2 cache 51. The index from hash engine 68 can be combined with an entry number of the entry within the bucket as an index into level-2 cache 51 to select second-level entry 50.

Each second-level entry 50 contains key field 54, which is loaded with some or all of the bits of input key 66 when an entry is allocated and loaded with valid data. Since input key 66 can have a variable length, key length field 52 indicates the number of bits in input key 66. For small keys, some of the bits in key field 54 may contain empty or pad bits that are riot part of the key.

For very large keys, key field 54 is too small to contain the entire key. The excess key bits are stored in key extension 62, which is an entry in level-3 cache 61. Key pointer 56 in second-level entry 50 contains a pointer to key extension 62. Input key 66 is thus stored partially in key field 54 and partially in key extension 62 for long keys, but only in key field 54 for small keys.

Application-specific data such as file attributes and permissions can be stored in second-level entry 50 in data field 58. When a large amount of data needs to be stored, data pointer 59 points to the additional overflow data in data extension 64 in level-3 cache 61. Data-extension flag 57 can be set when writing the data entry to indicate that some of the data is stored in data extension 64 in level-3 cache 61. Data pointer 59 can be the last 8 bytes of data field 58. When data-extension flag 57 is set, these last 8 bytes are data pointer 59. When data-extension flag 57 is not set, these last 8 bytes are the final 8 bytes of data for data field 58.

Level-2 cache 51 has larger entries than level-1 cache 41, allowing for more bits to be stored. In this example, level-1 entries are 8 bytes, while level-2 entries are 20 bytes. Level-3 extension can be any length.

The smaller tag field 36 in entry 40 in level-1 cache 41 allows for a smaller memory to be used for level-1 cache 41, resulting in faster access than for level-2 cache 51. The smaller hashed key in tag field 36 allows for quick pre-screening of entries in a bucket. Usually only one matching entry needs to be further checked for full-key matching in level-2 cache 51, resulting in fewer accesses of slower in level-2 cache 51.

Figure 4:
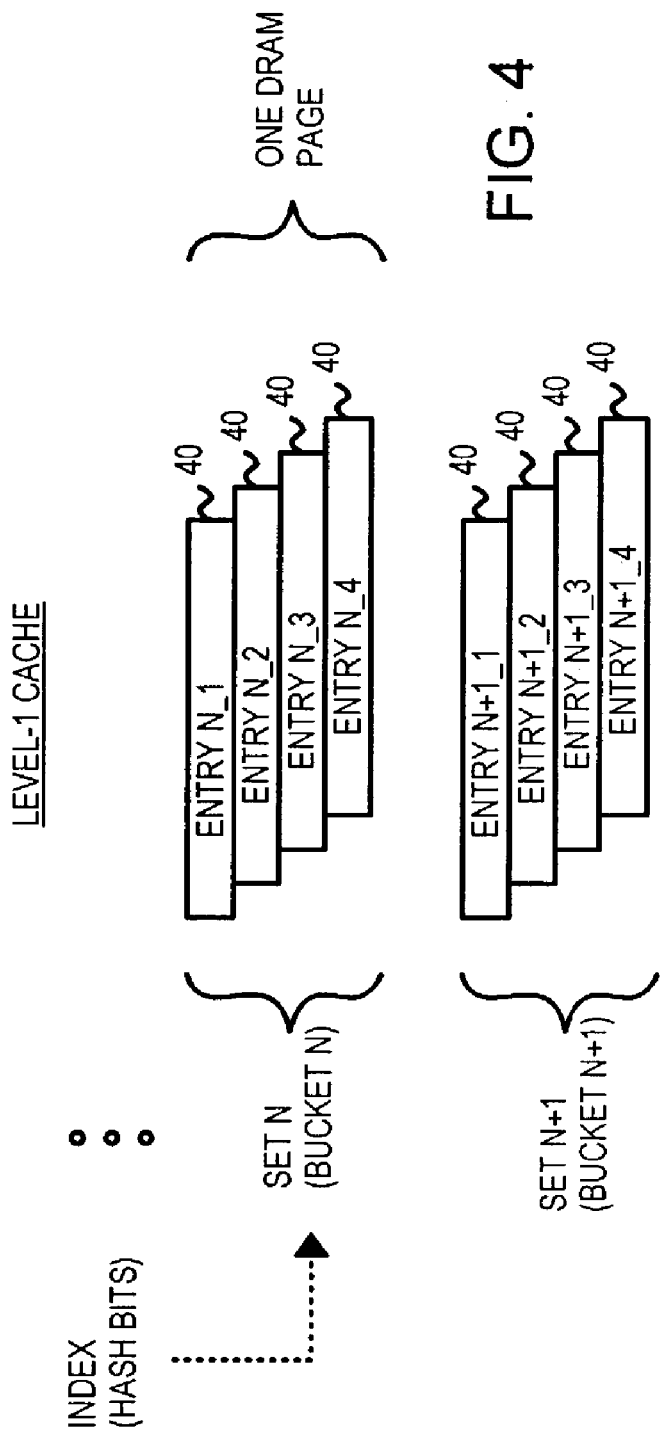
FIG. 4 highlights organization of the level-1 cache.

FIG. 4 highlights organization of the level-1 cache. A set-associative cache is used, where the index selects (addresses) one of the sets or buckets. Each set or bucket contains several entries. These entries form an associative mini-cache for their index since any of the entries in a bucket can be selected and loaded with an entry for the index.

Hashing the variable-length key produces many hash bits. The lower 19 hash bits form the index that selects one of the 512K buckets in the level-1 cache. Other index sizes and numbers of buckets can be substituted for different cache sizes. Using 20 bits allows 1 M buckets to be addresses within one section, while 16 hash bits could address 64K buckets. Each bucket can have several entries, such as 2, 8, 16, or some other number. In this example, each bucket has 4 entries 40.

In one embodiment, the size of each entry 40 is chosen to minimize memory accessing. When a page-mode DRAM is used for storing entries 40, memory accesses can be minimized by having all four entries in a bucket fit into the same DRAM page. The four entries 40 have a total of (4×8) 32 bytes, or 256 bits. This can fit within a DRAM page, which is often 2K or 4K bits in size, and within a smaller burst-mode page. Burst cycles may also be used to speed up the access when an entry fits within a burst page.

Figure 5:
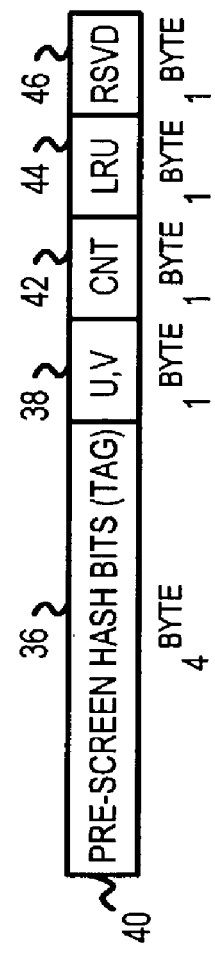
FIG. 5 shows in more detail one entry in the level-1 cache.

FIG. 5 shows in more detail one entry in the level-1 cache. Entry 40 is one of several entries in a bucket that can match a hashed tag or be allocated on a miss. Four bytes of the hashed input key are compared to tag field 36 to pre-screen the entries in a bucket. When no entries in the bucket selected by the index match tag field 36, a miss is signaled. When one or more entries match tag field 36, further processing is required to determine if a full key match has occurred. The key(s) from the level-2 perhaps level-3 entries are compared to the input key to determine if a full match has occurred. Thus comparison of tag field 36 is only a pre-screening based on a partial hash tag.

Various control bits can be stored in level-1 entry 40. Update and valid bits 38 contain an update bit (U) that is set when an entry is being updated, preventing other processes being executed on a multi-threaded or multi-pipelined processor from accessing the entry. Setting the update bit allows the current lookup instruction to operate atomically because execution of other instructions by other processor pipelines cannot alter the entry when the update bit is set. Instead, other instructions must wait until the update bit is cleared upon completion of the current lookup instruction.

The valid bit (V) is set when the entry has been allocated and loaded with valid data. When an entry is invalidated, such as for cache coherency with a larger memory, the valid bit is cleared even though the old data is still present in the entry. Other multi-bit updating and valid schemes could be employed.

A multi-bit counter is kept by reference-count byte 42. This counter can be incremented for each process that is given a pointer to the entry. When one of the processes finishes consuming data for the entry, the reference-count is decremented. After all four processes consume the data, reference-count byte 42 reaches zero, indicating that the entry can now be replaced since all processes have finished reference data for the entry.

LRU byte 44 contains least-recently-used information to aid in selecting one of the entries in a bucket for replacement on a miss. A pseudo-LRU scheme can be used, or a more exact LRU, or some other scheme such as a timestamp. Reserved byte 46 contains bits that can be used by the processor for future enhancements.

Figure 6:
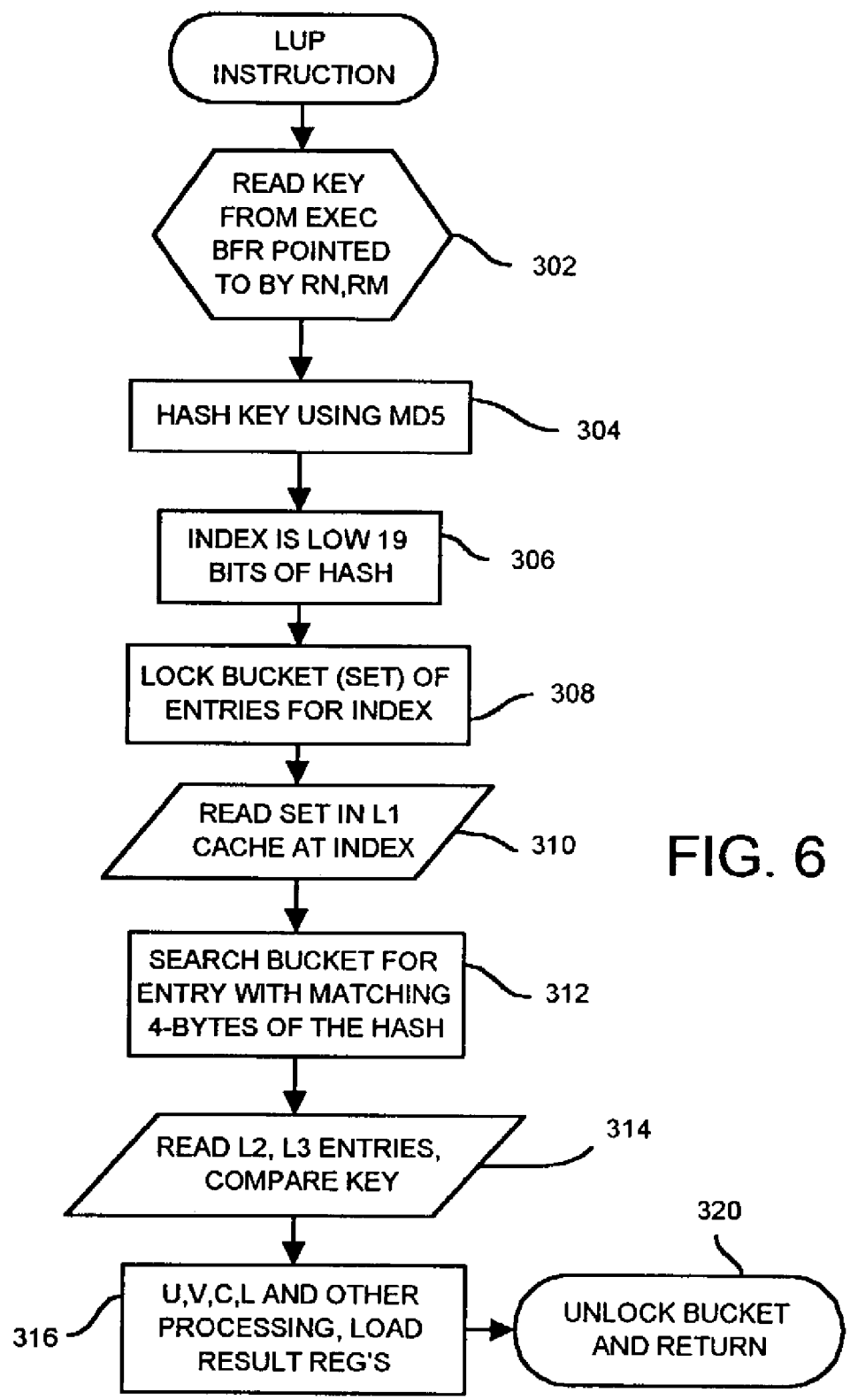
FIG. 6 is a flowchart of execution of a lookup instruction by a processor execution unit.

FIG. 6 is a flowchart of execution of a lookup instruction by a processor execution unit. After decoding of the lookup instruction and identification of the operand registers, the input operand registers are read for the pointer to the key entry in the execution buffer and its length. Using the pointer and length, the key is read from the execution buffer, step 302.

The input key is hashed using a hashing algorithm such as the MD5 algorithm, step 304. The lower 19 bits of the hash become the index, step 306, that selects one of the buckets in the level-1 cache. The bucket is locked, step 308, to prevent any other running processes on a multi-threaded machine from interfering with the lookup instruction. A lock table can be maintained separate from the lookup cache that contains a list of locked indexes for each section of the lookup cache, or some other method of locking can be used.

All the entries in the bucket selected by the index are read, step 310. This may require several memory accesses, or just one memory access when all entries are within a single burst-memory page any can be bursted in a single memory access. entries could also be read one-by-one and compared.

The tag fields of all entries read from the selected bucket are compared to the tag portion of the hashed input key, step 312. When one or more entries have tag fields that match, a preliminary hit is found. Further processing is required. The valid bit in the entry can also be checked at this preliminary stage to eliminate invalid matches from further processing.

Entries in the level-2 cache that correspond to the matching level-1 entries are read, step 314. This may require several slower memory access cycles, but only one or perhaps two entries need to be read in level-2, while all 4 or 8 entries in level-1 had to be read in step 310 for pre-screening. Various addressing schemes can be used, and the level-3 extensions may also have to be accessed to get the full key for longer key lengths. The full key(s) from the level-2 and level-3 entries are compared to the input key to determine if a full key match has occurred. Sometimes the smaller hash tag in the level-1 cache matches, but the full key does not match.

The control bits of the fully matching entries are processed, step 316. The tag hit becomes a match when the full key from levels 2 and 3 match and the valid bit in level-1 is set.

Further processing specific to the particular variation or flavor of the lookup instruction is performed, step 316. For valid matches, the addresses of the entries in the level-1 and level-2 cache are written into the result registers identified by the result operand field. Some instruction flavors write the value of the control bits to the result register, while other flavors copy data to or from the level-2 entry and the execution buffer. The reference-count byte 42 can be incremented or decremented for some instruction flavors, and the LRU byte can be adjusted to reflect the recent reference of this entry. The valid bit can be cleared when the invalidate flavor is executed, or when a miss occurs and an entry is selected for replacement. The update bit can be set when the entry is being updated or allocated on a miss, and cleared once the update is complete. Various other U, V, C, L processing can also occur.

Finally the bucket is unlocked, allowing other processes to access entries in the bucket, step 320. Execution of the lookup instruction ends. The update bit may remain set, locking just one entry in the bucket when several instructions are needed to load data to update the entry.

Figure 7A:
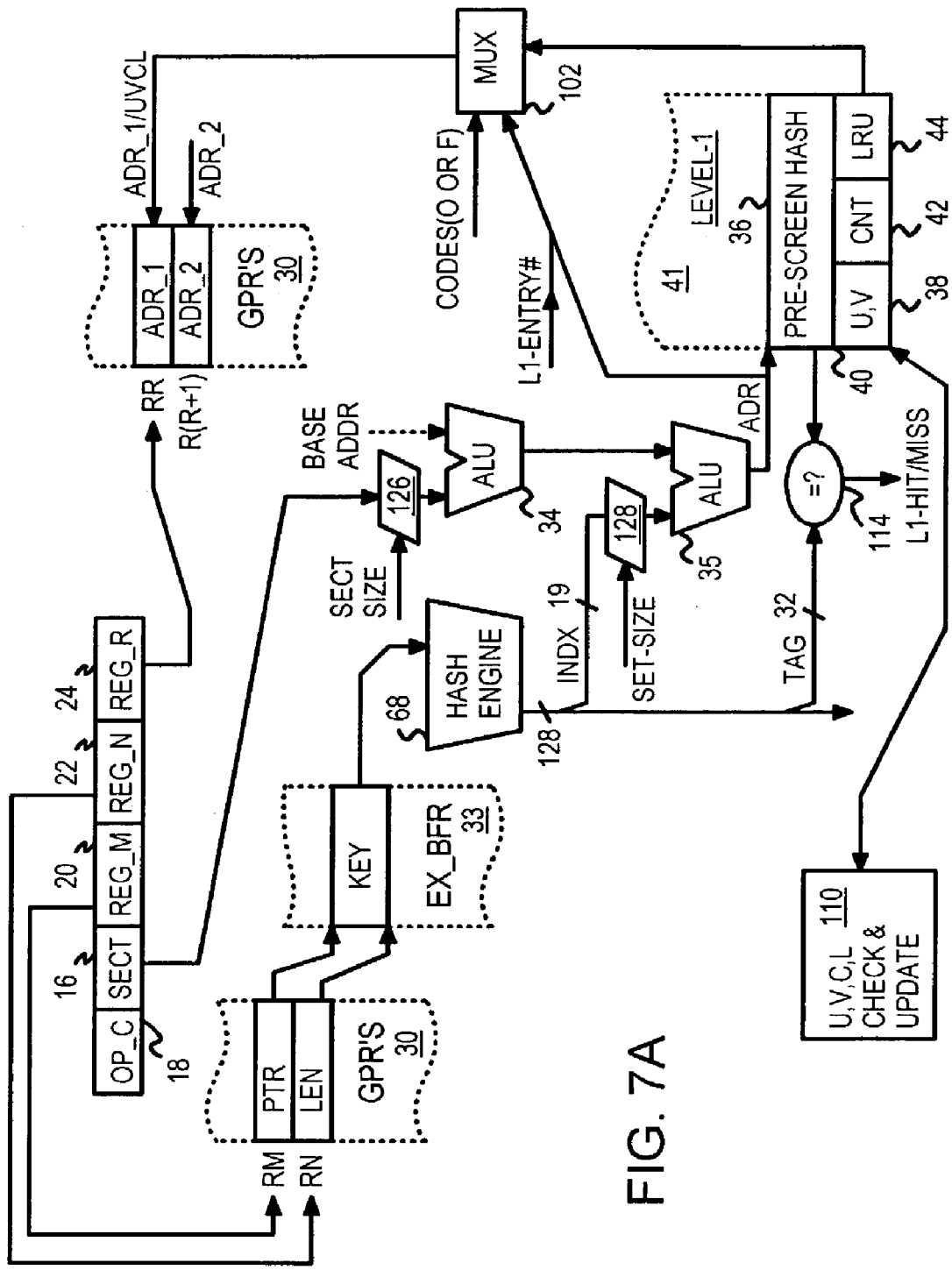
FIGS. 7A–B diagram execution of a lookup instruction.
Figure 7B:
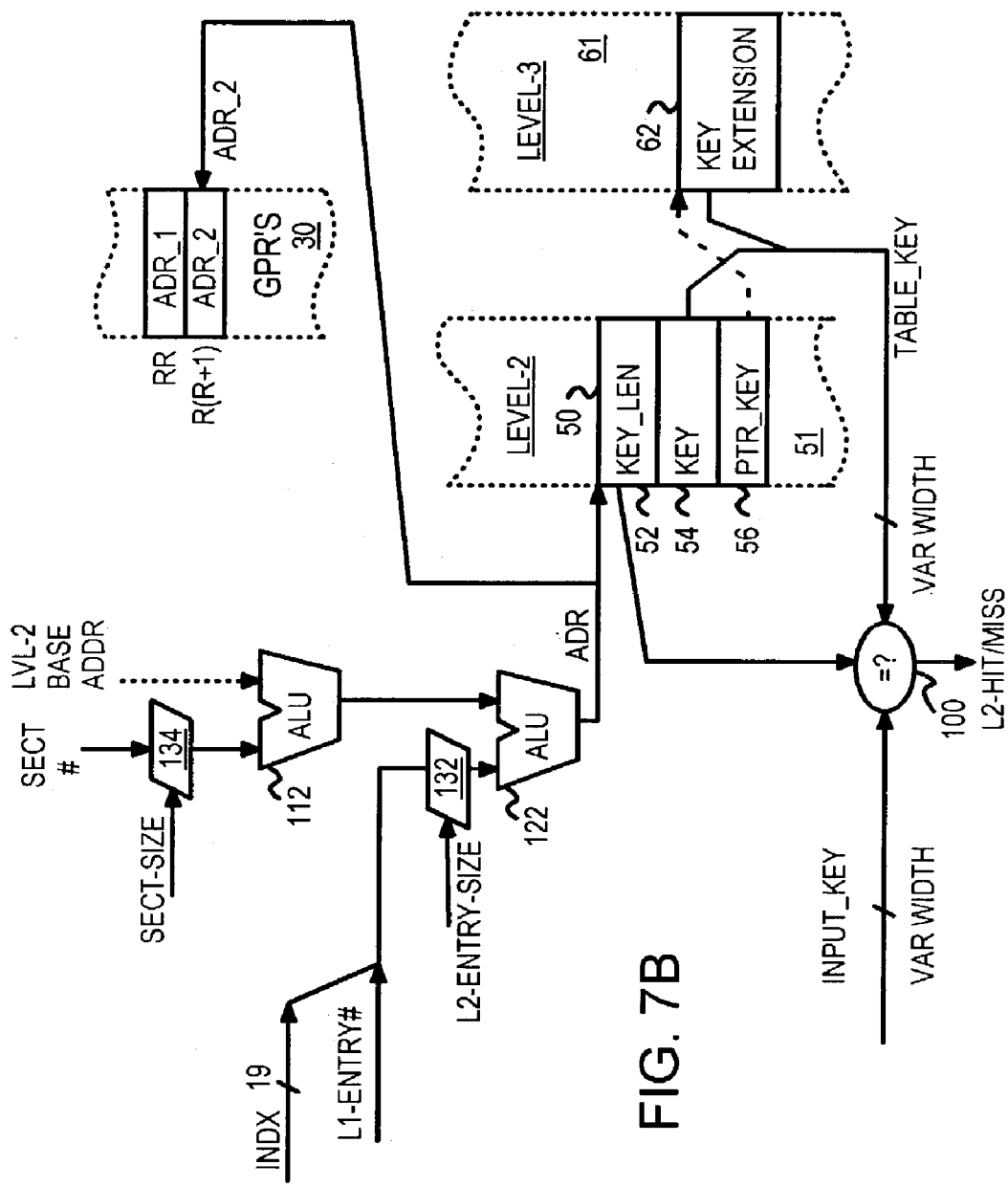

FIGS. 7A–B diagram execution of a lookup instruction. FIG. 7A highlights operand decoding, address generation, and entry lookup in the level-1 cache, while FIG. 7B highlights access of level-2 and level-3 entries and full key matching.

The lookup instruction in instruction register 18 is decoded to get the location of operand and result registers. Operand field 20 contains a 5-bit number that identifies register M (RM) in GPR's 30, which contains a pointer rather than a data value. The pointer, PTR_1, points to a location in execution buffer 33 that contains the key, KEY. However, since the key can be variable in length, the size or length of the key is also needed. This length LEN is stored in the register RN. Knowing its location and length, KEY can be read from execution buffer 33.

The input key is a tag string that is searched for in the tag portion of the lookup cache. Each entry in the lookup cache has a tag and data associated with that tag. The lookup key can be variable in length, but hash engine 68 forms a fixed-length hash of all bits in the input key using a hashing algorithm such as MD5. The 128-bit hash output is divided into a 19-bit index and a 32-bit tag, and the other hash bits are discarded.

The section number of the lookup cache is read from section field 16 of instruction register 18 and multiplied or scaled by the section size using multiplier 126 before being added to the base address of the level-1 cache using adder 34. Alternately, different base addresses could be selected by section field 16.

Adder 34 outputs the starting address of the section in the level-1 lookup cache. To this section starting address is added the hashed index multiplied by the size of a set or bucket using multiplier 128 and adder 35. The address of the bucket selected by the index is generated by adder 35. All 4 or 8 entries in the selected bucket are read from level-1 cache 41.

Each entry's tag field 36 is compared to four bytes of the hash by comparator 114. When one of the entries in the bucket has a matching tag field 36, a level-1 hit is detected. The matching entry 40 can be further verified by checking that the valid bit in update, valid bits 38 is set using U, V, C, L checker 110. When two of the entries match, further processing is required of both entries.

Often only one entry matches, although rarely 2 or more entries could match the tag, since the tag is not the full key. When the full key from level-2 is matched, the address of this entry is written to result register RR in GPR's 30 that is identified by operand field 24 in instruction register 18. The bucket address from adder 35 is further refined to point to the matching entry within the bucket, such as by including lower-level address bits in the address, or by performing another add.

Some instruction flavors write the control byte from matching entry 40 to result register RR rather than the level-1 entry address. Mux 102 routes update and valid bits 38, reference-count byte 42, and LRU byte 44 and any other control bits to register RR. Sometimes a result code such as a failure or success code is written to result register RR. For example, a miss can be signaled by writing a null value, 0x00000000, to the result register.

Further processing on the level-2 and level-3 entries is shown in FIG. 7B. When level-2 cache 51 has the same organization as level-1 cache 41, the same level-1 index can be used to find the corresponding level-1 entry. A more complex level-2 or level-3 address generation may be substituted. The level-1 entry number for the matching level-1 entry in the bucket is combined with the bucket index such as by concatenating lower address bits or adding. This level-1 entry index is multiplied by the size of level-2 entries by multiplier 132 and added by adder 122 to the starting address of the section in level-2 cache 51, which is generated by multiplier 134 and adder 112 from the section number in section field 16, the level-2 section size, and the level-2 base address of level-2 cache 51.

The output of adder 122 is the address of the entry in level-2 cache 51, ADR_2. On a full-key match, this second-level address is often written to the register following result register RR in GPR's 30, register R(R+1).

The level-2 entry address from adder 122 allows a memory-access unit to read second-level entry 50 from level-2 cache 51. The key's length is read from length field 52, and the corresponding number of bits is read from key field 54. When the key length is longer than key field 54, more key bits are read from key extension 62. The address of key extension 62 is formed using the address pointer in key pointer 56, which may be added to a base address for level-3 cache 61. An absolute address could also be used. The key bits from key field 54 and key extension 62 are combined to form the full key and compared to the full input key by comparator 100. The key compared by comparator 100, rather than the hash tag compared by comparator 114 (FIG. 7A), determines whether a hit or miss occurs, along with the valid bit from the level-1 entry.

Since both the input key and the table key read from level-2 cache 51 and level-3 cache 61 can be variable length, the lengths must be accounted for. Comparator 100 compares the number of bits indicated by length field 52. Also, the length of the input key must match length field 52. The length of the input key is obtained from the key length LEN from register RN.

Instruction "Flavors"—FIGS. 8A–G

Many possible variants or flavors of the basic lookup instruction are contemplated. Some architectures and processors may implement some but not other flavors, and other combinations are possible such as lookup-increment with update. The same opcode can be used for all flavors, with the flavor code being decoded to select the particular variant.

Figure 8A:
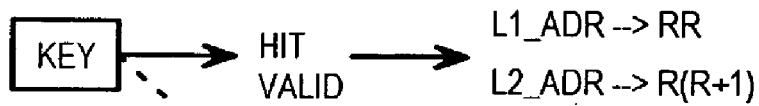
FIGS. 8A–G highlight variations of the basic lookup instruction.

FIG. 8A highlights the basic lookup instruction. The flavor code is 0x0. The input key is read from the execution buffer using the register-operand pointer and length. The level-1 cache is searched (pre-screened) for matching entries, and the corresponding entry or entries in the level-2 cache are read and the full keys compared to the input key to determine if a hit occurs. When the valid bit is also set for an entry with a matching key, a valid hit is signaled. The address of the matching level-1 entry is written to result register RR while the address of the matching level-2 entry is written to result register R(R+1). On a miss result register RR is written with an error code such as null (all zeros).

Figure 8B:
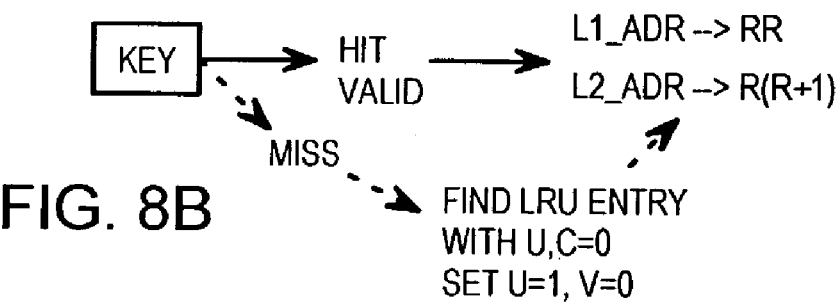

FIG. 8B highlights the lookup-update instruction. The flavor code is 0×4. A valid hit is processed as described for the basic lookup instruction with the addresses of the matching level-1 and level-2 entries written to result registers RR and R(R+1). On a miss an update can occur. The least-recently used entry in the bucket is found using the LRU bytes. Only a LRU entry with the update bit (U) cleared and the count byte (CNT) at zero can be selected; when the LRU entry has U or CNT greater than zero, of the next recently used entries are selected instead. When all entries have the U bit set or the count byte non-zero, none of the entries are selected and result register RR is written with an error code such as null (all zeros).

On a miss when an LRU entry has U=0 and CNT=0, the LRU entry is selected for updating and its U bit is set. Setting the U bit prevents other processes from using that entry while it is being updated. The entry's valid bit is cleared to invalidate the old entry data. The address of the selected level-1 entry and its corresponding level-2 address are written to result registers RR and R(R+1).

Figure 8C:
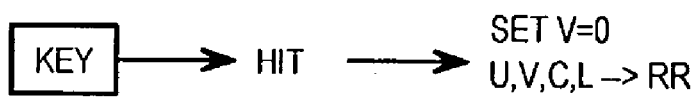

FIG. 8C highlights the lookup-invalidate instruction. The flavor code is 0×3. A hit is processed as described for the basic lookup instruction, except that the matching entry's valid bit is cleared to zero. This invalidates the matching entry. Also, rather than returning addresses of the matching level-1 and level-2 entries, the control bits (U, V, C, L, etc) in the matching level-1 entry are written to result register RR. On a miss result register RR is written with an error code such as null (all zeros).

Figure 8D:
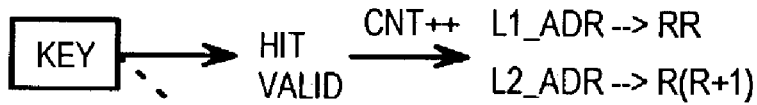

FIG. 8D highlights the lookup-increment instruction. The flavor code is 0×1. The count byte in the matching level-1 entry is incremented on a valid hit. Hit processing is otherwise as described for the basic lookup instruction with the addresses of the matching level-1 and level-2 entries written to result registers RR and R(R+1). On a miss result register RR is written with an error code such as null (all zeros).

Figure 8E:
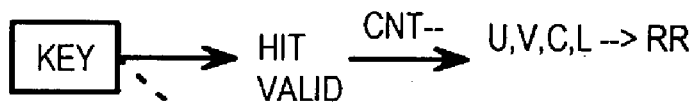

FIG. 8E highlights the lookup-decrement instruction. The flavor code is 0×2. The count byte in the matching level-1 entry is decremented on a valid hit. Hit processing is otherwise as described for the basic lookup instruction except that the control bytes (U, V, C, L, etc) in the matching level-1 entry are written to result register RR. On a miss result register RR is written with an error code such as null (all zeros).

Figure 8F:
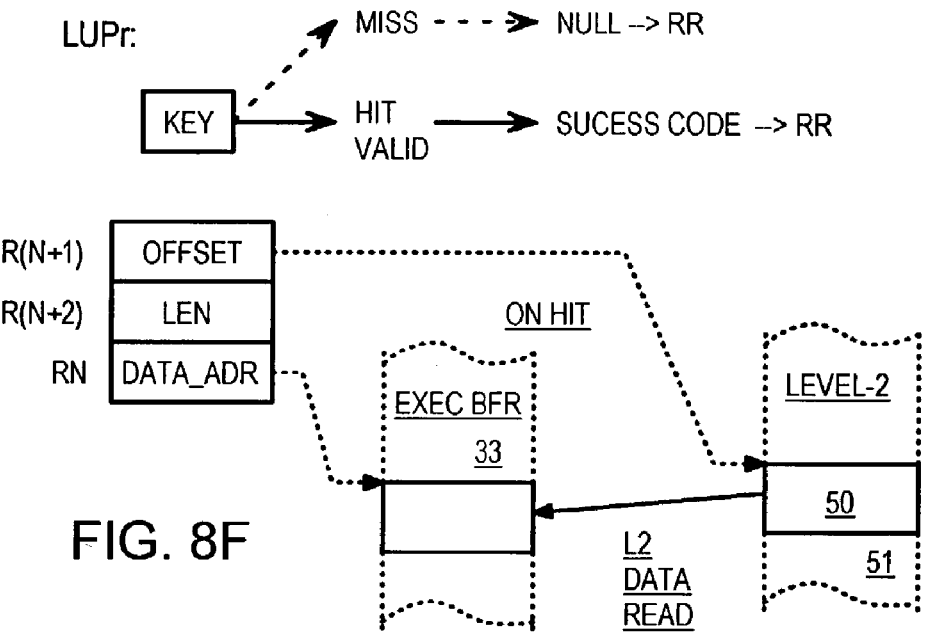

FIG. 8F highlights the lookup-read instruction. The flavor code is 0×8. This instruction reads data from the level-2 entry into the execution buffer on a valid hit. This automatic reading of data can allow for more efficient processing since a separate instruction to read the cached data is not required.

The input key is compared as before to find a valid hit, except that only one operand is used to point to the key, rather than two operands. When a valid hit is found, a copy is performed from that matching level-2 entry in level-2 cache 51 to execution buffer 33.

The entire input key is pointed to by the first operand, register M. A larger length in the execution buffer can be designated by register R(M+1). The second operand field designates register RN which is programmed with a data pointer. The data pointer in register RN points to a data buffer region in the execution buffer that the level-2 data is copied to. The following register R(N+1) is programmed with an offset within the level-2 entry while register R(N+2) is programmed with a data-copy length.

During execution of the lookup-read instruction with a valid hit, data is copied from second-level entry 50 in level-2 cache 51, starting at the offset from register R (N+1) for a length of the number of bytes indicated by the data-copy length in register R(N+2). This data is written to execution buffer 33 starting at the location pointed to by the data pointer in register RN. The result register RR is written with a result code, such as all ones (0×FFFFFFFF) for success or null (all zeros) for a failure or a miss.

Figure 8G:
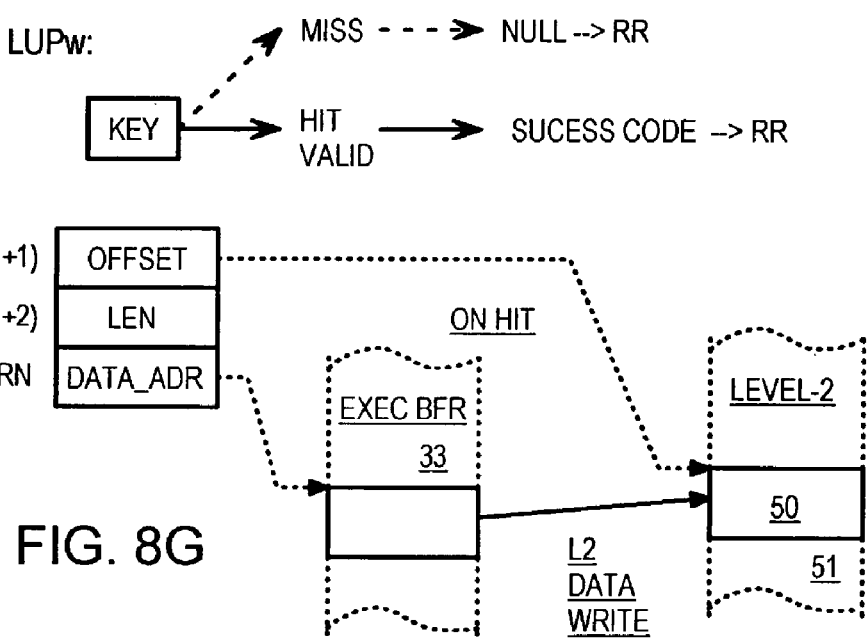

FIG. 8G highlights the lookup-write instruction. The flavor code is 0×5. This instruction write data to the level-2 entry into the execution buffer on a valid hit. This automatic writing of data can allow for more efficient processing since a separate instruction to update the cached level-2 data is not required.

The input key is compared as before to find a valid hit, except that only one operand is used to point to the key, rather than two operands. When a valid hit is found, a write is performed to that matching level-2 entry.

The entire input key is pointed to by the first operand, register M. The length of the key in the execution buffer is programmed into register R(M+1) before lookup instruction execution. The second operand field designates register RN which is programmed with the data pointer. The data pointer in register RN points to the data buffer region in the execution buffer that the level-2 data is copied from. The following register R(N+1) is programmed with a byte offset from the start of the data portion of the level-2 entry while register R(N+2) is programmed with a data-copy length.

During execution of the lookup-write instruction with a valid hit, data is copied from the data buffer in execution buffer 33, from the location pointed to by the data pointer in register RN. The data from execution buffer 33 is written to second-level entry 50 in level-2 cache 51, starting at the offset from register R(N+1) for a length of the number of bytes indicated by the data-copy length in register R(N+2). The result register RR is written with a result code, such as all ones (0×FFFFFFFF) for success or null (all zeros) for a failure or a miss.

The lookup-read and lookup-write instructions may also access data stored in the third level. When the level-2 entry indicates that an extension exists in level-3, then the processor can also read the level-3 entry pointed to by the pointer in the level-2 entry. For writes, the new level-2 entry can be examined during instruction execution. If the new level-2 entry contains too much data for the level-2 entry, then the excess data can be written to a new level-3 entry. Pointers to the new level-3 entry can be stored in the level-2 entry and returned to the calling program, such as by being written to a register. Alternately, some embodiments may not directly access level-3 entries but only read and write pointers from the level-2 entry, allowing the calling program to update the level-3 entries directly.

Figure 9:
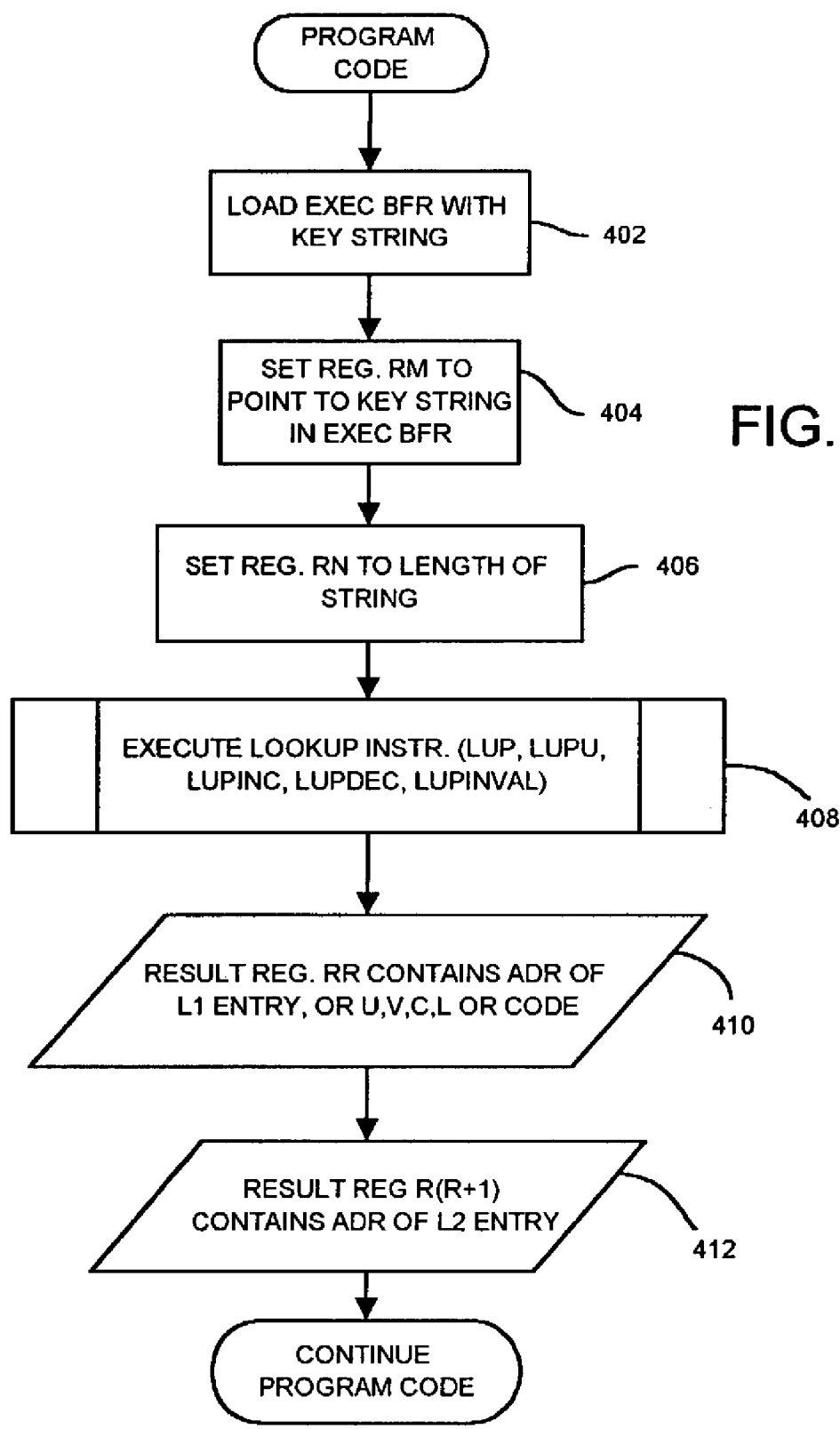
FIG. 9 is a flowchart showing program code that executes a lookup instruction.

FIG. 9 is a flowchart showing program code that executes a lookup instruction. The lookup key is written into the execution buffer, step 402. General-purpose register RM is written with a pointer to the lookup key, step 404. The length of the key in the execution buffer that is pointed to by register RM is written to register RN, step 406.

The lookup instruction is executed, step 408. One of several variations may be executed in this program flow, such as the basic lookup, or the update, invalidate, increment, or decrement flavors. For the basic, update, and increment flavors, result register RR contains the pointer to the matching entry in the level-1 cache, step 410, while register R(R+1) contains a pointer to the level-2 entry, step 412. For the invalidate and decrement flavors, result register RR contains the U, V, C, L control bytes, step 410. These register can be read by later instructions in the program code.

Figure 10:
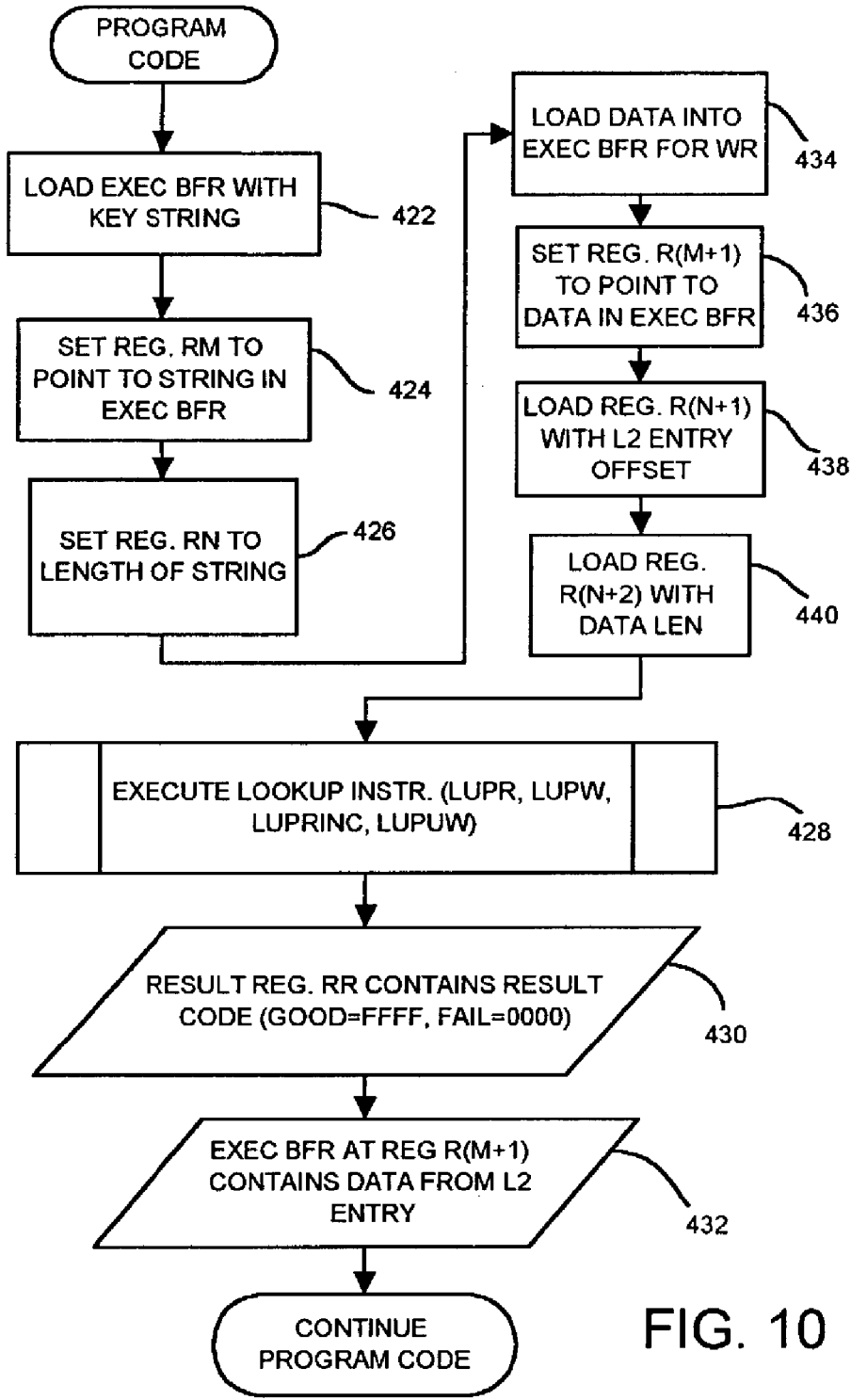
FIG. 10 is a flowchart showing program code that executes a lookup instruction with automatic data copy.

FIG. 10 is a flowchart showing program code that executes a lookup instruction with automatic data copy. The lookup key is written into the execution buffer, step 422. General-purpose register RM is written with a pointer to the lookup key, step 424. The length of the key in the execution buffer pointed to by register RM is written to register RN, step 426.

The data to be written to the level-2 entry (for lookup-writes) is written to the execution buffer, step 434. Register R(M+1) is loaded with a pointer to the data-buffer location in the execution buffer, step 436. Register R(N+1) is loaded with the offset within the level-2 entry, step 438. Register R(N+2) is loaded with the data-copy length, step 440.

The lookup instruction is executed, step 428. One of several automatic-copy variations may be executed in this program flow, such as lookup-read, lookup-write, lookup-read-increment, lookup-write-update, etc. Execution of the write flavors causes the data to be copied from the data buffer in the execution buffer to the matching level-2 entry starting at the offset (register R(N+1)) for the length of the data-copy in register R(N+2). Execution of the read flavors causes the data to be copied from the matching level-2 entry starting at the offset (register R(N+1)) for the length of the data-copy in register R(N+2). The data is copied from the matching level-2 entry to the data buffer in the execution buffer at location pointed to by register R(M+1).

After execution, result register RR contains a result code for success or failure, step 430. For read flavors, the level-2 data copied is available in the data buffer in the execution buffer at the location pointed to by register RN, step 432. This data can be read by later instructions in the program code.

Applications—FIGS. 1–15

In the following section several practical applications are shown for a processor that can execute a native lookup instruction. One application field that is particularly interesting is for a file-application processor (FAP) that can offload some file processing from a host system such as a file server on a network such as the Internet. The FAP can act as an accelerator for a network-file-system (NFS) server or host. Other applications include offloading some processing from a database server, a security server, a content server, or other host systems that require lookups of various tables.

In addition to a network stack or interface, a NFS server has a file system module that often contains caches of various tables to improve performance. The FAP can also contain a smaller cache of these tables, allowing the FAP to offload some requests from the host's file system module. The FAP can cache entries from various tables in difference sections of its lookup cache. The table from the host that can be cached by the FAP can include the inode, name-lookup, export, page, and mount caches.

An Inode cache in a file system keeps track of file attributes such as size, ownership details, permissions, etc. The inode cache is accessed for almost for all NFS file operations, as inode represents the internal OS representation of a file in a file system. A standard NFS implementation generates a file handle based on the inode number and a generation number along with other details. So every NFS request from client which carries an opaque (for the client) file handle that needs to be resolved into a corresponding inode. This requires the host to lookup the inode cache in order to find an exact match. If no match is found, the host needs to get the inode details from the disk.

Keeping part of the inode cache on the FAP allows the FAP to lookup the inode cache for the host and send a response directly back to the NFS client without interrupting the host for some NFS requests such as Getattr/Access etc. The Host file system module in tandem with FAP engine keeps the inode cache on the FAP in a consistent state.

Software running on the host keeps track of in-core (in-memory) inodes. Any time an in-core inode gets created in the host, it's attributes and a memory pointer (opaque handle) are passed from the host to the FAP cache. The opaque handle here an address of the in-core inode structure in the host memory. The host keeps track of this FAP cache mirroring by setting a flag in the host inode structure. This in-core flagging of an inode entry allows the host to keep the memory valid until there is a valid reference to it in the FAP cache.

When file attributes change, an update message is sent by the host to the FAP cache. This message contains the latest inode attributes. This is done prior to sending any NFS reply to the client. Anytime an inode entry is about to get recycled on the host (due to an LRU scheme or memory requirement), the host sends a special message to the FAP. Code running on the FAP then looks for the given inode entry, sets it opaque handle to NULL and responds back to host. This scheme allows the FAP to cache inode entries that might have been recycled on the host. When a file gets removed or deleted, the host sends a special message to invalidate the inode in the FAP. The FAP code looks up the given inode entry and invalidates it, such as with a LUPinval instruction, and sends the response back to the host. In both cases, on receiving the response the host removes the flag on the inode entry and allows it to get recycled.

Figure 11:
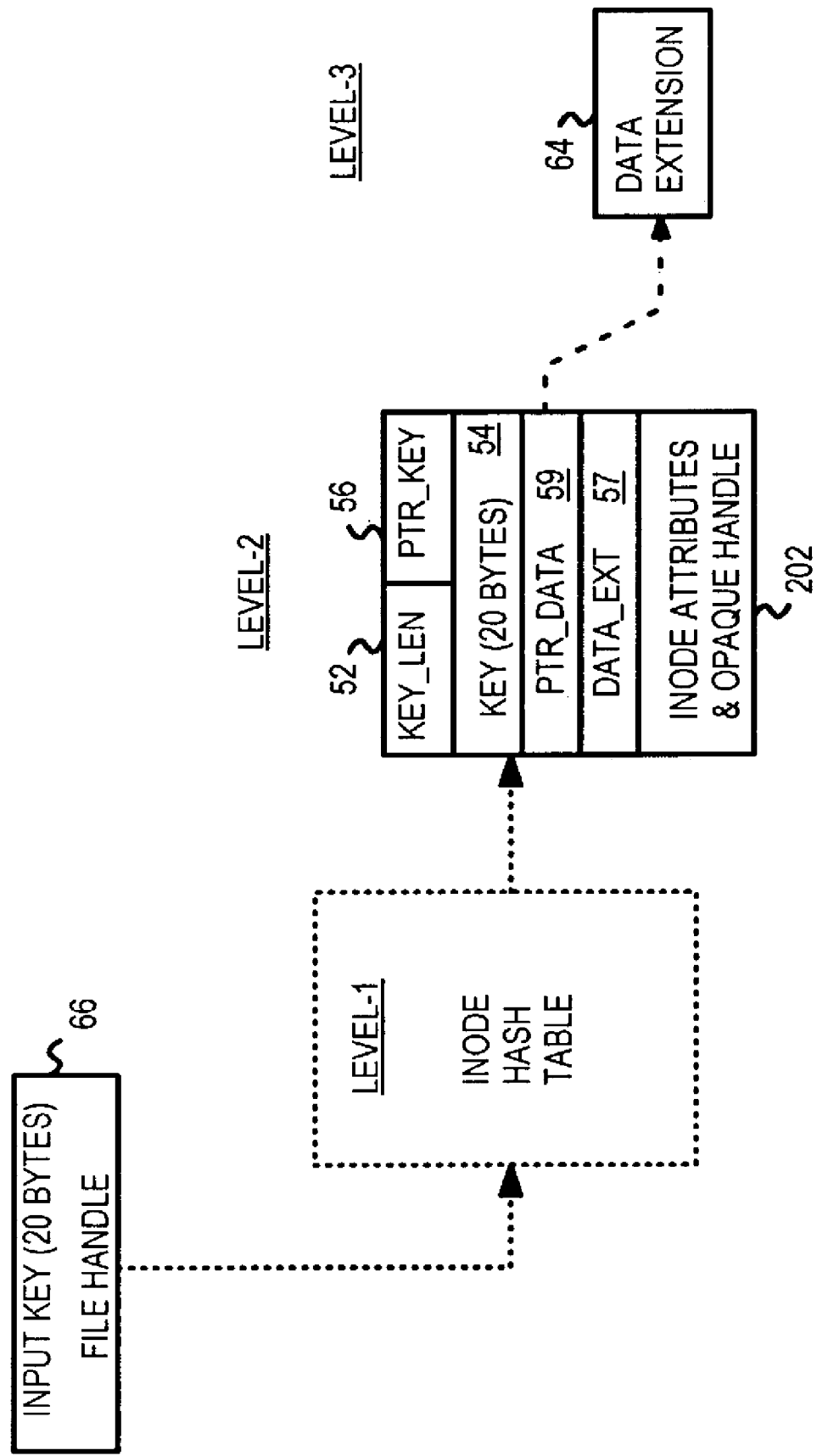
FIG. 11 shows an inode entry for a file-access processor (FAP) that executes native-instruction lookups to offload host requests.

FIG. 11 shows an inode entry for a file-access processor that executes native-instruction lookups to offload host requests. On receiving an NFS request, the FAP code searches through the inode cache using the file handle as key 66. The file handle is 20 bytes long in this example. One of the sections of the lookup cache is structured to store inode entries. Lookup within this section of the level-1 cache emulates an inode hash table since hashed tags are used for pre-screening. If a matching level-1 entry is found, the key from the level-2 entry is checked and the FAP responds to the client, producing an early termination of the getattr/access request. For other requests the FAP gets the opaque handle (host memory inode reference pointer) and sends a pre-processed NFS request to host. The FAP cache also invalidates the matching inode entry any time an NFS request comes in which changes the entry's inode metadata or makes it obsolete (e.g. write/create/delete/setattr etc.).

The level-2 inode entry contains key field 54 with the entire 20-byte key, so no key extension in the level-3 cache is needed. Key pointer 56 is disabled, such as by setting it to null. Key length field 52 is set to 160 bits (20 bytes).

However, the inode entry contains many inode attributes and the opaque handle, so the inode entry is data-intensive. Some of the data may be stored in data field 202, but the overflow data is stored in data extension 64 in the level-3 cache. Data pointer 59 points to the overflow data in the level-3 cache. Data-extension flag 57 can be set to indicate that some of the data is stored in data extension 64 in the level-3 cache.

Figure 12:
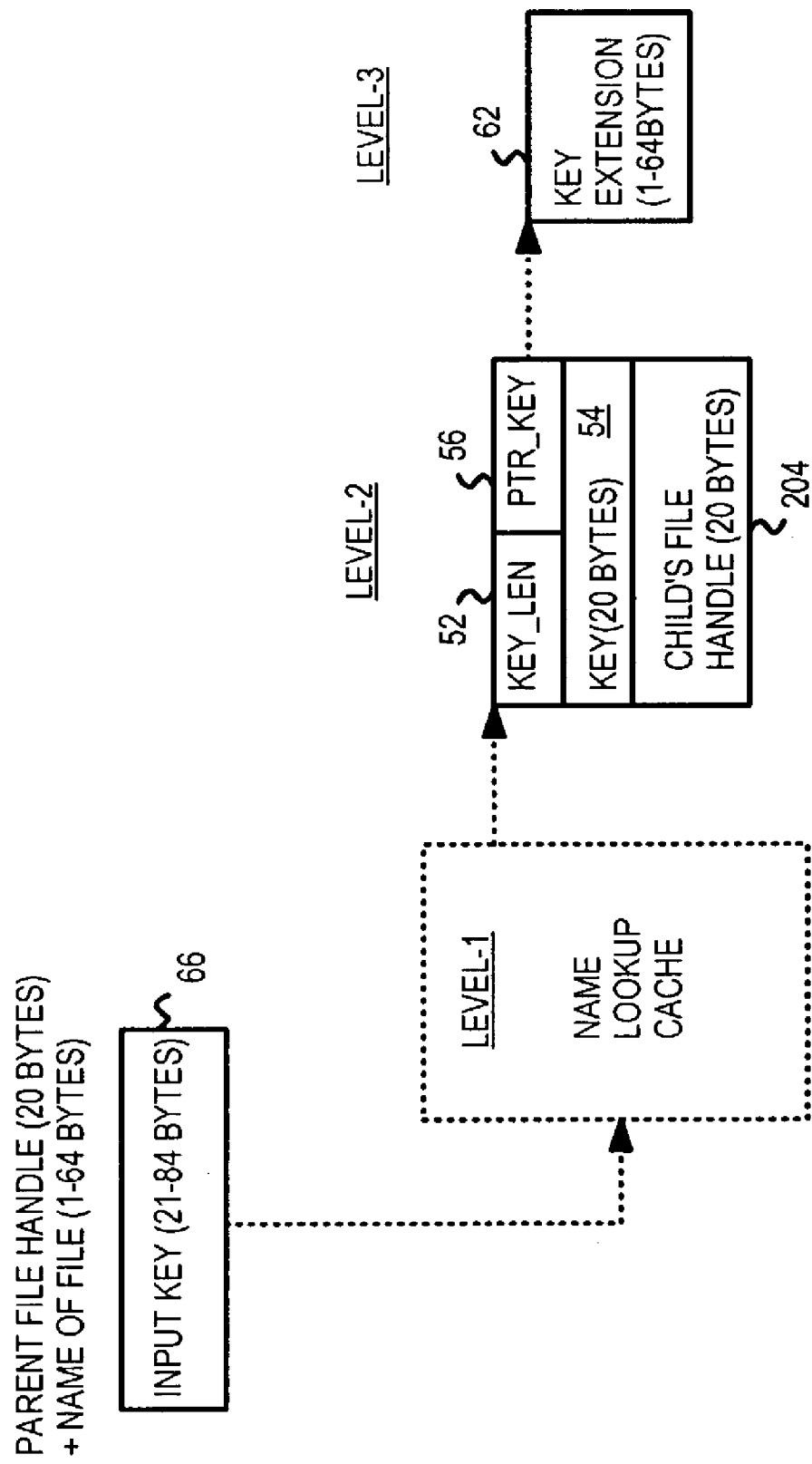
FIG. 12 shows an entry in a name cache for a FAP that executes native-instruction lookups to offload host requests.

FIG. 12 shows an entry in a name cache for a file-access processor that executes native-instruction lookups to offload host requests. Input key 66 is a 21 to 84 byte variable-length string made up of the 20-byte parent file handle and the file name, which can be 1 to 64 bytes long. The level-1 cache acts as a name lookup cache. The level-2 entry contains a 20-byte child's file handle as data field 204. For long keys, key pointer 56 points to the rest of the key in key extension 62. Shorter keys can fit in key field 54 and don't need key extension 62.

The name cache allows file system module to quickly lookup a file based on its name. The file system keeps a cache of name-to-inode translations for quicker access to the inode without going to disk every time. This cache is useful for NFS operations such as lookup/rename/remove etc.

Figure 13:
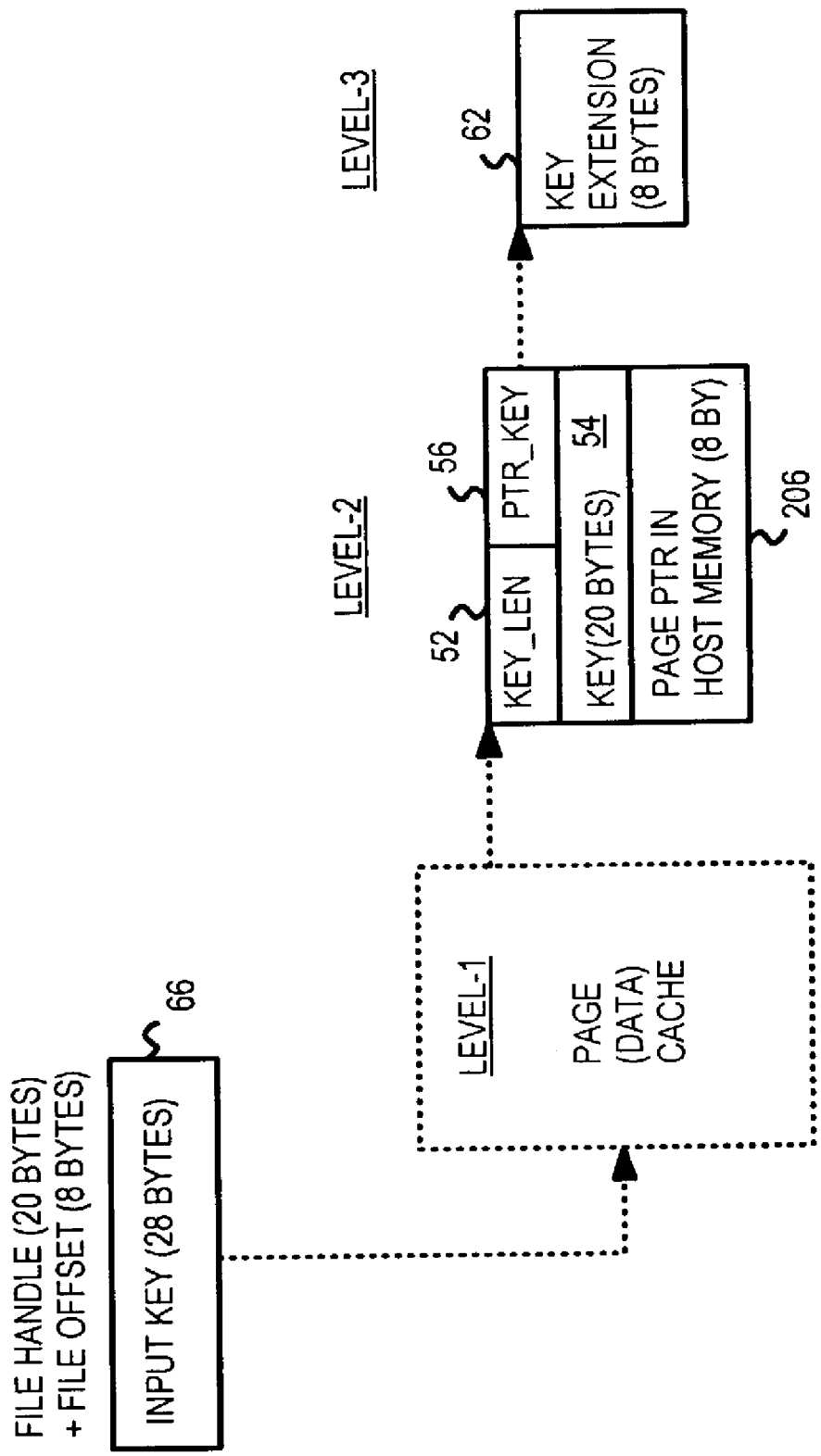
FIG. 13 shows a page cache.

FIG. 13 shows a page cache. Input key 66 contains a 20-byte file handle and an 8-byte offset to the data. The level-2 entry contains an 8-byte page pointer to the page of data in the host's memory as data field 206. Since key field 54 is only 20 bytes, key pointer 56 points to the remaining 8 bytes of the key in key extension 62.

Figure 14:
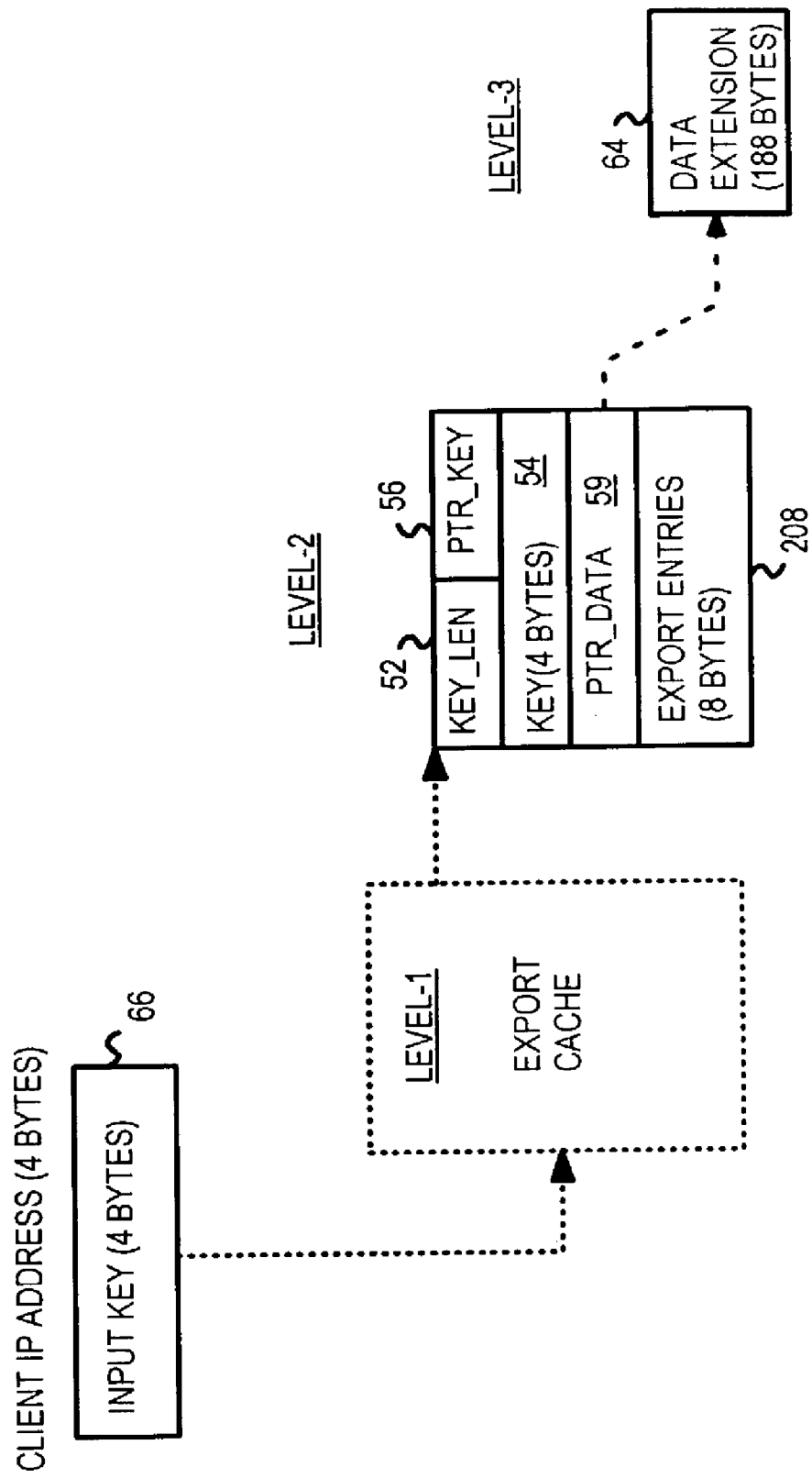
FIG. 14 shows an export cache.

FIG. 14 shows an export cache. Input key 66 contains a 4-byte Internet-Protocol IP address of the client. Since the key is so small, the whole key can fit in key field 54 in the level-2 entry. However, the data is an export entry that may be large. The first 8 bytes of the export entry is stored in data field 208, while the remaining bytes (188 bytes in this example) are stored in the level-3 data extension 64 and pointed to by data pointer 59.

Figure 15:
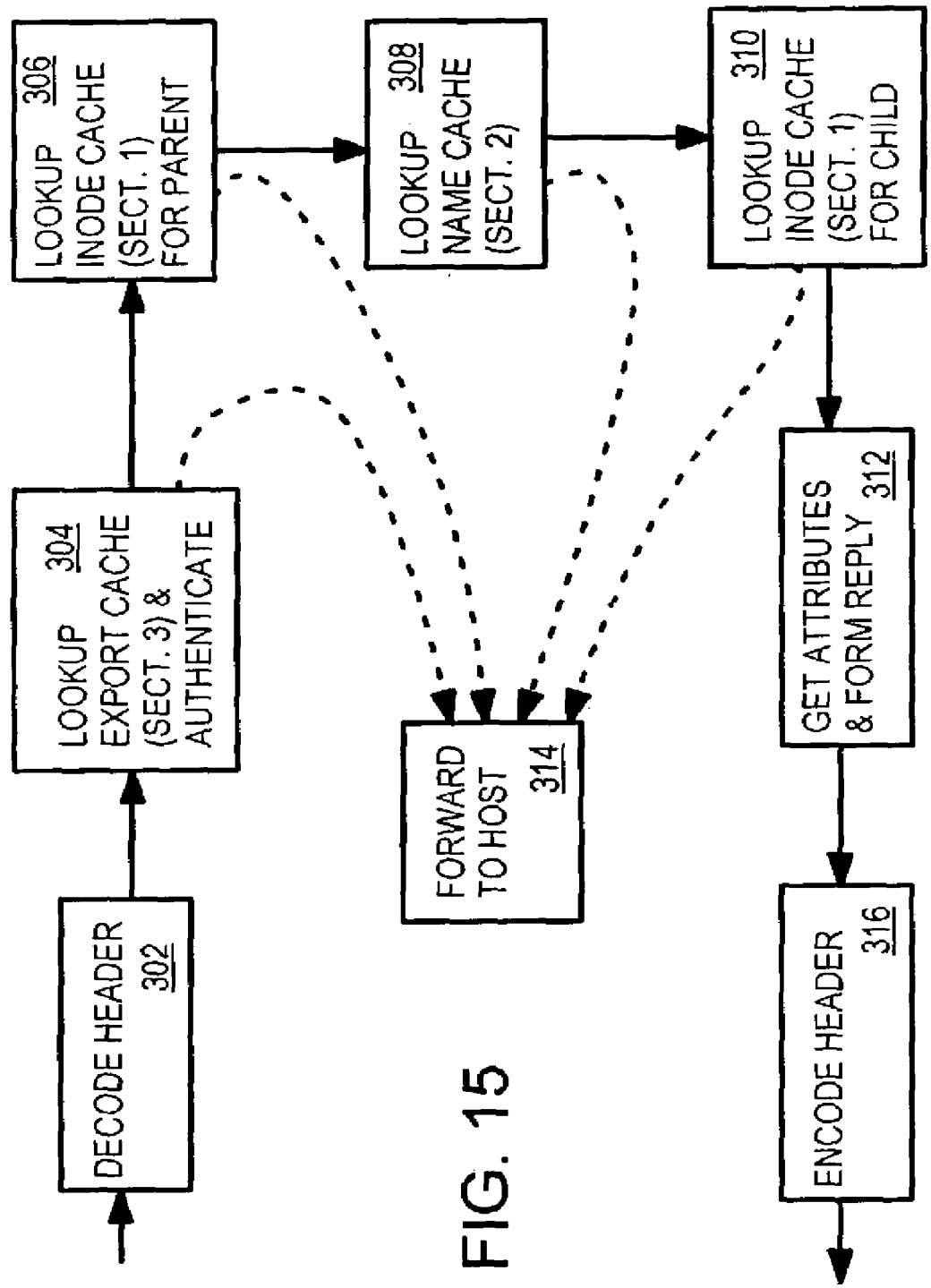
FIG. 15 shows the FAP performing a series of lookups for a host.

FIG. 15 shows the FAP performing a series of lookups for a host. A request message is received from a network such as the Internet or from another source. The request's header is decoded, step 302, to locate the client (requestor's) IP address. This client IP address is the key to the export table shown in FIG. 14. The export entry is read from the export table, step 304, and authenticated.

The export entry from the export table is used to search the inode table (FIG. 11), step 306, for the parent attributes and an opaque handle. The parent file handle and the file name can be combined or concatenated to form a key to the name cache (FIG. 12), which can be searched to find the child's file handle, step 308.

The inode cache is again search, this time for the child attributes, step 310. These attributes are used to form the reply, step 312, and the reply message header is generated, step 316.

The different tables can reside in different section of the lookup cache memory. For example, the export table can reside in section 3, while the inode cache is in section 1 and the name cache is in section 2. The specific table searched is determined by the section number field in the lookup instruction.

Any of the four lookups in steps 306, 306, 308, 310 can miss. When a miss occurs, and no entry is found, the request can be sent to the host, step 314, for further processing.

The lookup cache on the FAP can be accessed using the parent file handle and filename of the child. Any time the host looks for a given filename or when a new file gets created, the host can send the FAP information about it's parent file handle and the name along with file handle of the child itself. The FAP takes this data and enters it into name lookup cache with parent file handle and filename as a key and child's file handle as 2nd level data. the FAP also enters child's file handle and attributes into the inode cache.

Such caching allows the FAP to early-terminate lookup requests from NFS clients when the FAP finds both the entry into name cache as well as the corresponding attributes for the child file handle in the inode cache. In the event of renaming or removal of a file, the host sends a message to the FAP to invalidate the entry from both the name lookup cache as well as the inode cache.

ALTERNATE EMBODIMENTS

Several other embodiments are contemplated by the inventors. Different field widths and data widths can be substituted. For example, a bank of 64 registers can be used with a 6-bit operand field, and smaller or larger opcode fields can be specified. Fewer or more than 19 bits can be used for the index when larger or smaller caches are used, and a different number of entries per set (bucket) can be used, such as 8, 16, or 32 for more associative caches, or 2 for less associative caches. The tag and index can have different widths, and can use hash bits or unhashed key bits. The level-1 entry can have hashed tag bits or un-hashed tag bits. The index could be hashed while the tag in level-1 is not hashed. When not all of the key or hash bits are stored in the level-1 tag, the entry is pre-screened by matching the partial bits stored as the level-1 tag. Banks of registers can be swapped by context-swapping instructions or by other means. Other hashing algorithms or other functions can be substituted. Various instruction-ordering and entry or bucket conflict handling schemes can be implement in hardware, software, firmware, or some combination.

Having a section field in the instruction is not absolutely required. Instead, an address bit could be used to select sections in the cache, or a section could be chosen based on the currently running context. A section register could be used to indicate which section to access, or a combined cache could be used with a tag bit or other bit indicating which section or cache type each entry belongs to. The level-3 cache is not needed for some applications, or may contain only a data extensions or only key extensions.

Additional levels could be added to the cache. A 4-level cache could be used. Many alternative formats are possible for the key, pointer, data, and other fields in the various entries. Some of the fields in the level-2 entry could be moved to the level-1 entry. For example, the full key could be stored in the level-1 entry rather than the level-2 entry. A pointer to the data or key extension in level-3 could be placed in the level-1 entry. Many other variations are possible.

Rather than use just one key, two partial keys can be used. When only one key is needed, the second partial key can be disabled by a program such as by using a null value for its length. The partial keys can be concatenated to form the input key. When two partial keys are used, register RM could point to the first key, and the first key's length is stored in the following register R(M+1). The second operand for register RN could point to the second key, and the second key's length is stored in following register R(N+1).

Partial keys could be stored in GPR's 30 rather than in execution buffer 33 for smaller keys, and more than two partial keys could be combined, such as by pointing to a list of partial keys. Rather than concatenating partial keys, the partial keys could be combined by zero-extending and adding, subtracting, or performing some other operation.

The operands may be somewhat different for different instruction flavors. For example, the automatic copy flavors may use a single key with other flavors concatenate two partial keys. The second operand field may designate a register with a data pointer in the execution buffer to copy the level-2 data to and from, or another register may be used. The result register and the following register can hold the offset and copy length. Additional or fewer operand that three can also be substituted for any or all of the instruction flavors. Other registers could be used for the different operands such as the key, results, offset, data-copy length, etc. than the ones used in the examples. Offsets can be from the beginning of the data or key portion of a level-2 entry, or from the beginning of the entry, or from the beginning of a cache section or an offset from the beginning of the entire cache. Other offsets or absolute addresses could be substituted. Offsets could be byte-offsets, bit-offsets, word-offsets, or some other size.

The key-length operand could be replaced with a pointer to the end of the key, or a pointer to the location immediately following the end of the key, or some other code to allow the end of the key to be found. Various codes could be employed rather than a binary number indicating the number of bits or bytes in the key. Thus length can be specified in various ways including an end pointer. Extension-present flags could be used, or special encodings of fields could indicate presence of level-3 extensions.

SRAM or fast DRAM could be used for level-1 cache 41, while slower DRAM, solid-state, or disk storage could be used for in level-2 cache 51 and level-3 cache 61. The level-1 cache could be integrated onto the same chip as the processor pipelines. The bucket of entries read can be temporarily stored in memory buffers or in the execution buffer and accessed for comparison during instruction execution. A burst read may use one address but receive many data values over several cycles in a pre-defined burst sequence of addresses and cycles. The execution buffer could be within the processor core, or could reside in memory, or could reside partially in memory and partially in the core.

Execution may be pipelined, where several instructions are in various stages of completion at any instant in time. Complex data forwarding and locking controls can be added to ensure consistency, and pipestage registers and controls can be added. The entry update bit and bucket locks are especially helpful for pipelined execution of lookup instructions, and when parallel pipelines or parallel processors access the same lookup cache. Adders can be part of a larger unit-logic-unit (ALU) or a separate address-generation unit. A shared adder may be used several times for generating different portions of addresses rather than having separate adders. The control logic that controls computation and execution logic can be hardwired or programmable such as by firmware, or may be a state-machine, sequencer, or micro-code.

The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. 37 C.F.R. § 1.72(b). Any advantages and benefits described may not apply to all embodiments of the invention. When the word "means" is recited in a claim element, Applicant intends for the claim element to fall under 35 USC § 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein performing the function and their structural equivalents, but also equivalent structures. For example, although a nail and a screw have different structures, they are equivalent structures since they both perform the function of fastening. Claims that do not use the word means are not intended to fall under 35 USC § 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

The invention claimed is:

1. A processor comprising:
an instruction decoder for decoding instructions in a program being executed by the processor, the instructions including a lookup instruction;
a register file containing registers that store operands operated upon by the instructions, the registers being identified by operand fields in the instructions decoded by the instruction decoder;
a memory-access unit for accessing first-level entries and second-level entries of a lookup cache, the lookup cache including at least one of: an inode section that contains inode entries and file attributes, a name cache section that stores file-name entries, a page cache section that stores page entries, and an export cache section that stores export entries;
an address generator for generating a first-level address and a second-level address to the memory-access unit;
a comparator for comparing tags read from the first-level entries to a key derivative and for comparing stored keys read from the second-level entries to an input key; wherein the input key is a variable-length operand while the key derivative is generated from the input key;
a hashing engine, receiving the input key, for generating the key derivative from the input key; and
a lookup unit, activated by the instruction decoder when the lookup instruction is decoded, for performing a lookup operation indicated by the lookup instruction, the lookup operation searching the lookup cache for a matching second-level entry that has a stored key that matches the input key, whereby the lookup instruction is decoded and executed by the processor.

2. The processor of claim 1 wherein the lookup operation comprises:
reading the input key at a location indicated by the pointer operand in the register identified by the operand field in the lookup instruction;
activating the address generator to generate the first-level address from the input key;
activating the memory-access unit to read a plurality of first-level entries at the first-level address;
activating the comparator to compare tags read from the plurality of first-level entries to the key derivative;
activating the address generator to generate the second-level address for a second-level entry that corresponds to a first-level entry that the comparator indicates has a tag that matches the key derivative;
activating the memory-access unit to read a second-level entry at the second-level address; activating the comparator to compare a stored key read from the second-level entry to the input key to determine a key hit; and
when the key hit is determined, writing the second-level address to a result register and terminating execution of the lookup instruction, whereby lookup instructions are executed by the processor.

3. The processor of claim 2 further comprising:
an execution buffer for storing variable-length operands, wherein operands in the register file include pointer operands that indicate locations of the variable-length operands in the execution buffer;

wherein the register file contains a plurality of fixed-size registers that can each store an operand, a pointer operand, or a result;

wherein the result register is indicated by a result field in the lookup instruction that is decoded to locate the result register in the register file;

wherein the location of the variable-length operand in the execution buffer is indicated by a first operand field that indicates a first register in the register file that contains the operand pointer to a start of the input key;

wherein a length of the input key is indicated by a length value stored in a register in the register file that is indicated by a second operand field in the lookup instruction or indicated as a predetermined offset from the first register.

4. The processor of claim 3 wherein the result field directly indicates a second result register that is written with the first-level address for a matching entry while the second-level address is written to the result register which is indirectly indicated by the result field.

5. The processor of claim 3 wherein the second-level entry comprises:

a length field that indicates a length of the stored key; a key pointer that points to a key extension in a third-level of the lookup cache;

a key field that contains the stored key or a first portion of the stored key;

wherein the stored key is generated by combining the first portion of the stored key from the key field with the key extension from the third-level of the lookup cache when the length field contains a value greater that a length of the key field, whereby longer stored keys are stored in the second and third levels.

6. The processor of claim 1 wherein the hashing engine generates a fixed-length hash of the input key which is a variable-length operand;

wherein a first portion of the fixed-length hash is an index that is input to the address generator to select a bucket of first-level entries from a plurality of buckets, wherein each bucket is addressed by a different value of the first portion of the fixed-length hash and all entries in a bucket have a same index, whereby a hashed index selects the bucket of first-level entries.

7. The processor of claim 6 wherein a second portion of the fixed-length hash that does not include the first portion is the key derivative that is compared to the tags stored in the first-level entries, whereby hashed tags are compared.

8. The processor of claim 1 wherein the instruction decoder further comprises a flavor decoder that decodes a flavor field from the lookup instruction, the flavor field being decoded to select a sub-operation performed by the lookup unit when performing the lookup operation.

9. The processor of claim 8 wherein the first-level entries each further comprise a counter that is incremented by execution of a lookup instruction with an increment sub-operation indicated by the flavor field;

wherein the counter is decremented by execution of a lookup instruction with a decrement sub-operation indicated by the flavor field, whereby the counter in the first-level entry is incremented and decremented.

10. The processor of claim 1 wherein the first-level entries each comprise the tag and a valid bit that indicates validity of the first-level entry, and a least-recently-used LRU field indicating relative age of the first-level entry.

11. The processor of claim 1 wherein the first-level entries each comprise the tag and an update bit that is set by the lookup unit when a first-level entry is being updated and cleared once the first-level entry has been updated.

12. The processor of claim 1 further comprising:

an arithmetic-logic-unit (ALU) for executing add instructions and logic instructions decoded by the instruction decoder;

wherein the comparator and the address generator are part of the ALU that also executes add and logic instructions.

13. The processor of claim 1 wherein the lookup instruction further comprises a section field that indicates one of the sections of the lookup cache to search;

wherein the section field causes the address generator to address a different section of the lookup cache.

14. The processor of claim 1 wherein the second-level entry comprises:

a data field that contains data used by an application that looks up the second-level entry; and a data pointer that points to a data extension in a third-level of the lookup cache that contains additional data, whereby longer data fields are stored in the second and third levels.

15. A computerized method for executing a lookup instruction comprising:

decoding instructions for execution by a processor including decoding the lookup instruction that contains an opcode that specifies a lookup operation on a lookup cache, wherein the lookup cache includes at least one of: an inode section that contains inode entries and file attributes, a name cache section that stores file-name entries, a page cache section that stores page entries, and an export cache section that stores export entries;

decoding a first operand field in the lookup instruction and a result field in the lookup instruction, the first operand field specifying a first register that contains a key pointer to an input key in a buffer while the result field specifies a result register that a result of the lookup operation is to be written to;

reading an input key from a buffer at a location indicated by the key pointer;

utilizing a hash engine to hash the input key and thereby generate a hashed key;

generating an index from a first portion the hashed key and a hashed tag from a second portion of the hashed key;

generating a bucket address of a bucket of first-level entries in a first-level cache of the lookup cache;

reading a plurality of stored tags from first-level entries in the bucket addressed by the bucket address;

comparing the plurality of stored tags from the bucket to the hashed key to find a matching first-level entry in the bucket that has a stored tag that matches the hashed key;

generating a second-level address for a corresponding second-level entry that corresponds to the matching first-level entry;

reading a stored key from the corresponding second-level entry using the second-level address to locate the corresponding second-level entry;

comparing the stored key read from the corresponding second-level entry to the input key to determine a key match; and when the key match is found, writing the second-level address to the result register or to a second result register predetermined by the result field in the lookup instruction;

whereby the lookup instruction is decoded and executed to find the second-level address for a key match.

16. The computerized method of claim 15 further comprising:

reading a key length from a second register, the second register predetermined by the first operand field or decoded from a second operand field in the lookup instruction;

wherein reading the input key from the buffer comprises reading a number of bits from the buffer determined by the key length from the location indicated by the key pointer;

wherein comparing the stored key comprises comparing a number of bits indicated by the key length or validating a number of compared bits indicated by the key length, whereby variable-length input keys are read and compared.

17. The computerized method of claim 16 further comprising:

reading a key-extension pointer from the corresponding second-level entry;

when the key-extension pointer has a specified value, reading a third-level key extension at a location indicated by a key-extension pointer;

combining a partial key read from the corresponding second-level entry with the third-level key extension to generate the stored key for comparison to the input key when the key-extension pointer has the specified value, whereby long keys are stored in a third-level extension.

18. The computerized method of claim 15 further comprising:

decoding a variant field in the lookup instruction that indicates a variant of the lookup instruction that performs a variant operation;

executing the variant operation, the variant operation incrementing or decrementing a counter stored in the first-level entry, invalidating a valid bit in the first-level entry, or copying data to or from the corresponding second-level entry when the key match is found, or performing an update when no key match is found, whereby variants of the lookup operation are decoded and performed.

19. A specialized processor comprising:

decode means for decoding instructions including decoding a lookup instruction that contains an opcode that specifies a lookup operation on a lookup table;

a register file containing registers accessible by execution of instructions decoded by the decode means;

operand decode means for decoding a first operand field in the lookup instruction and a result field in the lookup instruction, the first operand field specifying a first register in the register file that contains a key pointer to an input key in a buffer and the result field specifying a result register in the register file that a result of the lookup operation is to be written to;

buffer means for storing variable-length operands including an input key that is read from the buffer means at a location indicated by the key pointer;

hash means for hashing the input key to generate a hashed key, the hashed key having an index and a hashed tag;

first address means, receiving the index, for generating a bucket address of a bucket of first-level entries in a first-level cache of the lookup table;

first match means for reading a plurality of stored tags from first-level entries in the bucket addressed by the bucket address and for comparing the plurality of stored tags from the bucket to the hashed key to find a matching first-level entry in the bucket that has a stored tag that matches the hashed key;

second address means for generating a second-level address for a corresponding second-level entry that corresponds to the matching first-level entry;

second match means for reading a stored key from the corresponding second-level entry using the second-level address to locate the corresponding second-level entry, and for comparing the stored key read from the corresponding second-level entry to the input key to determine a key match; and result means, responsive to the key match, for writing the bucket address to the result register and for writing the second-level address to a register that follows the result register; whereby the lookup instruction is decoded and executed to find the key match.

20. The specialized processor of claim 19 further comprising:

key combining means, responsive to a key extension field in the corresponding second-level entry, for reading a key extension in a third-level of the lookup table at a location indicated by a key-extension pointer field in the corresponding second-level entry when the stored key is larger than a limited key length for a second-level of the lookup table;

the key combining means forming the stored key by combining the key extension with a partial key read from the corresponding second-level entry.

* * * * *

UNITED STATES PATENT AND TRADEMARK OFFICE
CERTIFICATE OF CORRECTION

PATENT NO. : 7,093,099 B2  Page 1 of 1
APPLICATION NO. : 10/249359
DATED : August 15, 2006
INVENTOR(S) : Amod Bodas et al.

It is certified that error appears in the above-identified patent and that said Letters Patent is hereby corrected as shown below:

In the Claims:
Claim 5, lines 11-12, Col. 17, the text "a value greater that a length" should be replaced with --a value greater than a length--.

Claim 15, line 21, Col. 18, the text "a first portion the hashed key" should be replaced with --a first portion of the hashed key--.

Signed and Sealed this

Seventeenth Day of April, 2007

JON W. DUDAS
*Director of the United States Patent and Trademark Office*